Figure 1:
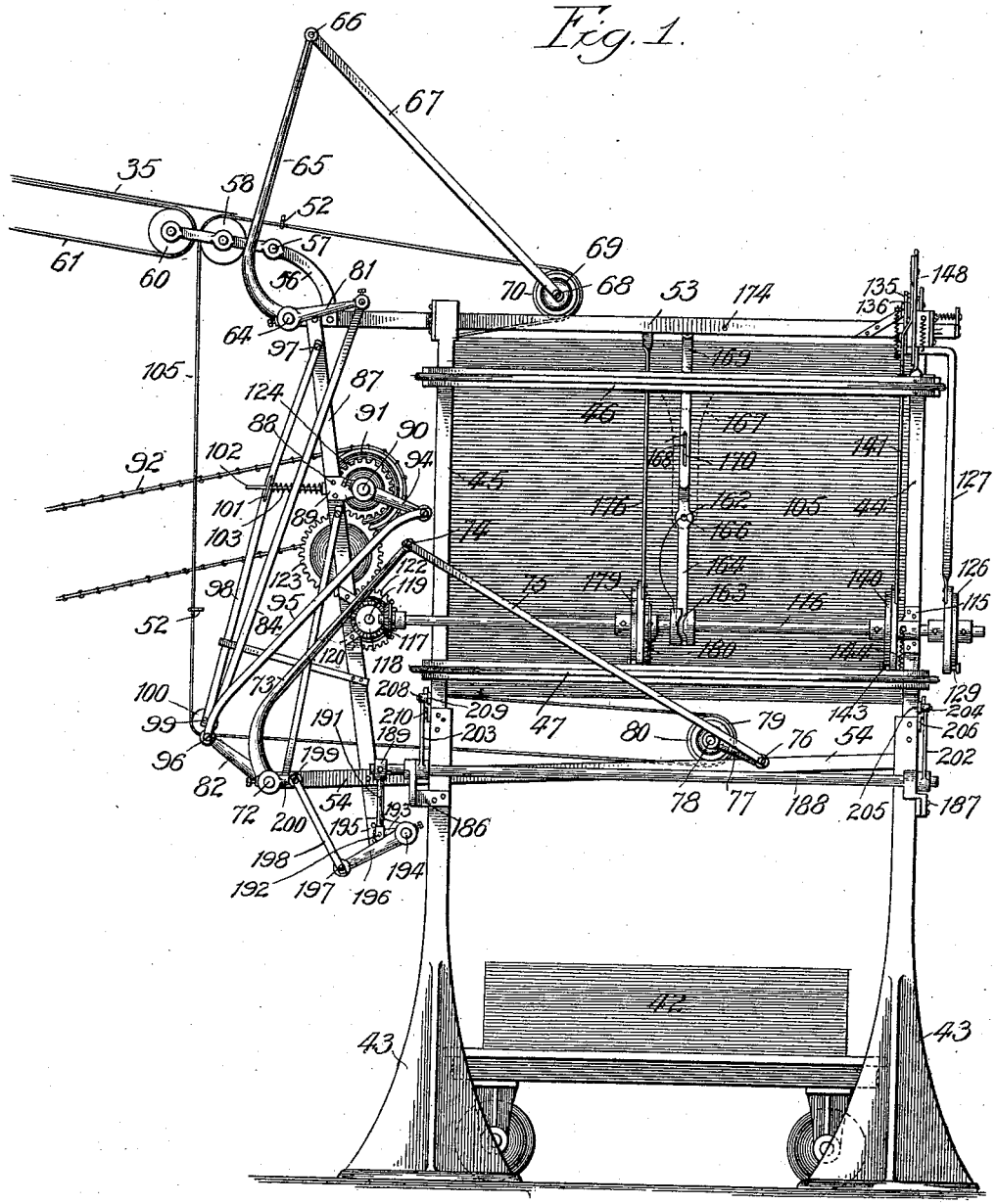

J. E. GILBERT.
SMUT SHEETING MACHINE.
APPLICATION FILED OCT. 30, 1905.

966,739.

Patented Aug. 9, 1910.
17 SHEETS—SHEET 1.

Witnesses:
Chas. E. Gaylord,
John Enders.

Inventor:
James E. Gilbert,
By Cheever & Cox
Attys.

J. E. GILBERT.
SMUT SHEETING MACHINE.
APPLICATION FILED OCT. 30, 1905.

966,739.

Patented Aug. 9, 1910.
17 SHEETS—SHEET 2.

Witnesses:
Inventor
James E. Gilbert,
By Cheever & Cox
Attys

J. E. GILBERT.
SMUT SHEETING MACHINE.
APPLICATION FILED OCT. 30, 1905.

966,739.

Patented Aug. 9, 1910.

17 SHEETS—SHEET 3.

Witnesses:

Inventor:
James E. Gilbert,
By Cheever + Cox
Attys.

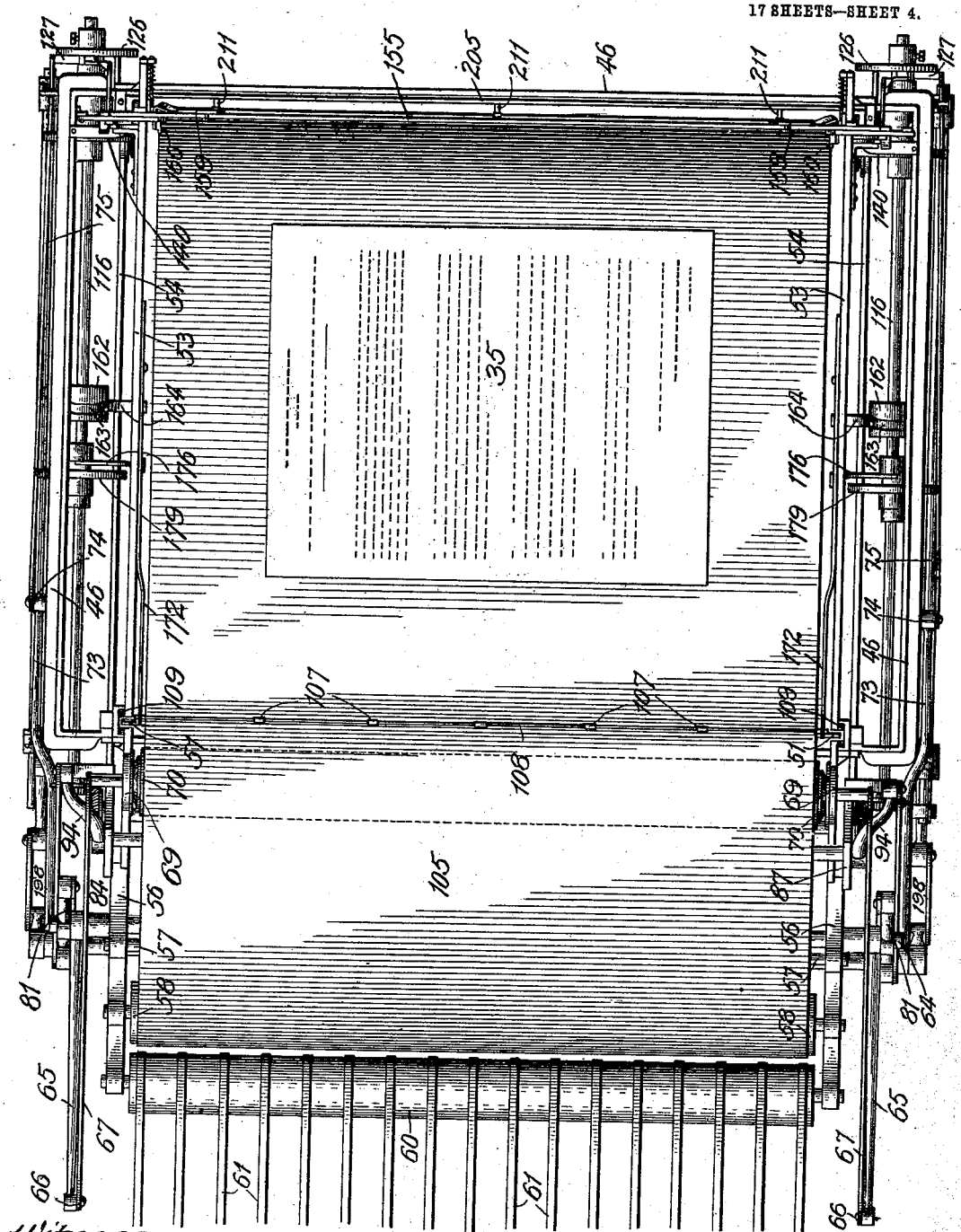

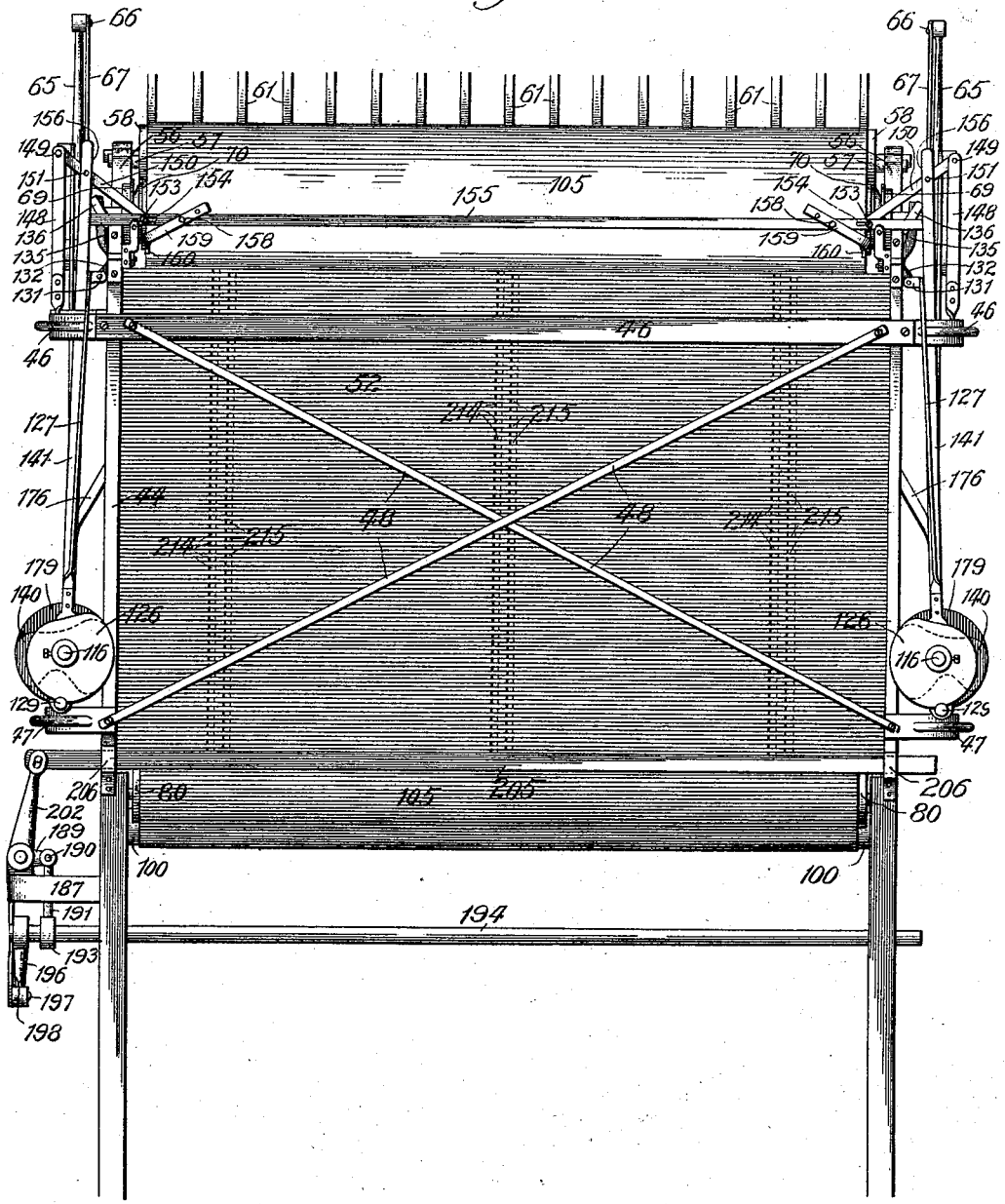

J. E. GILBERT.
SMUT SHEETING MACHINE.
APPLICATION FILED OCT. 30, 1905.
966,739.
Patented Aug. 9, 1910.
17 SHEETS—SHEET 6.
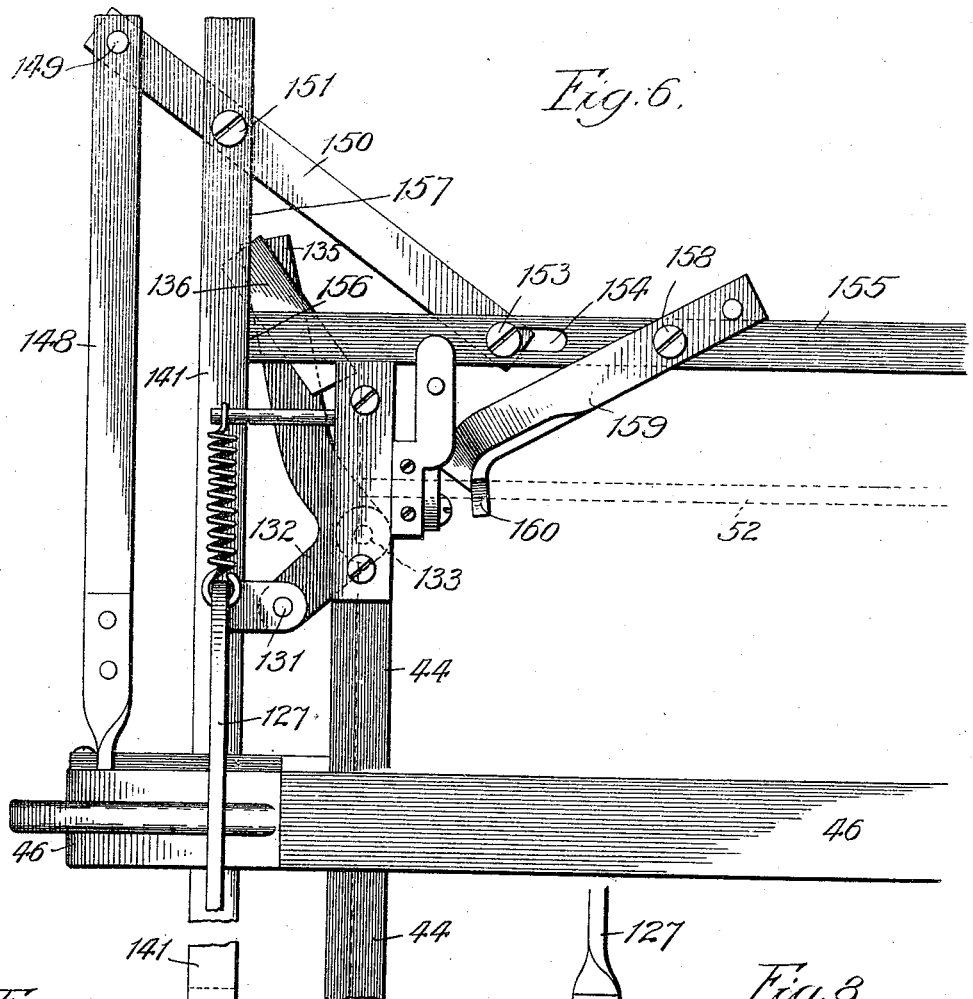
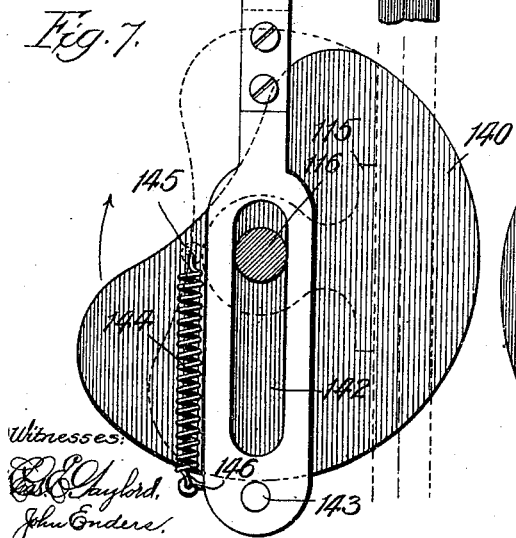
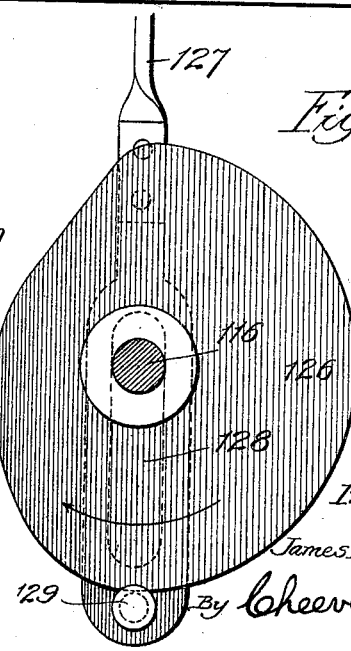
Inventor:
James E. Gilbert,
By Cheever & Cox
Attys.

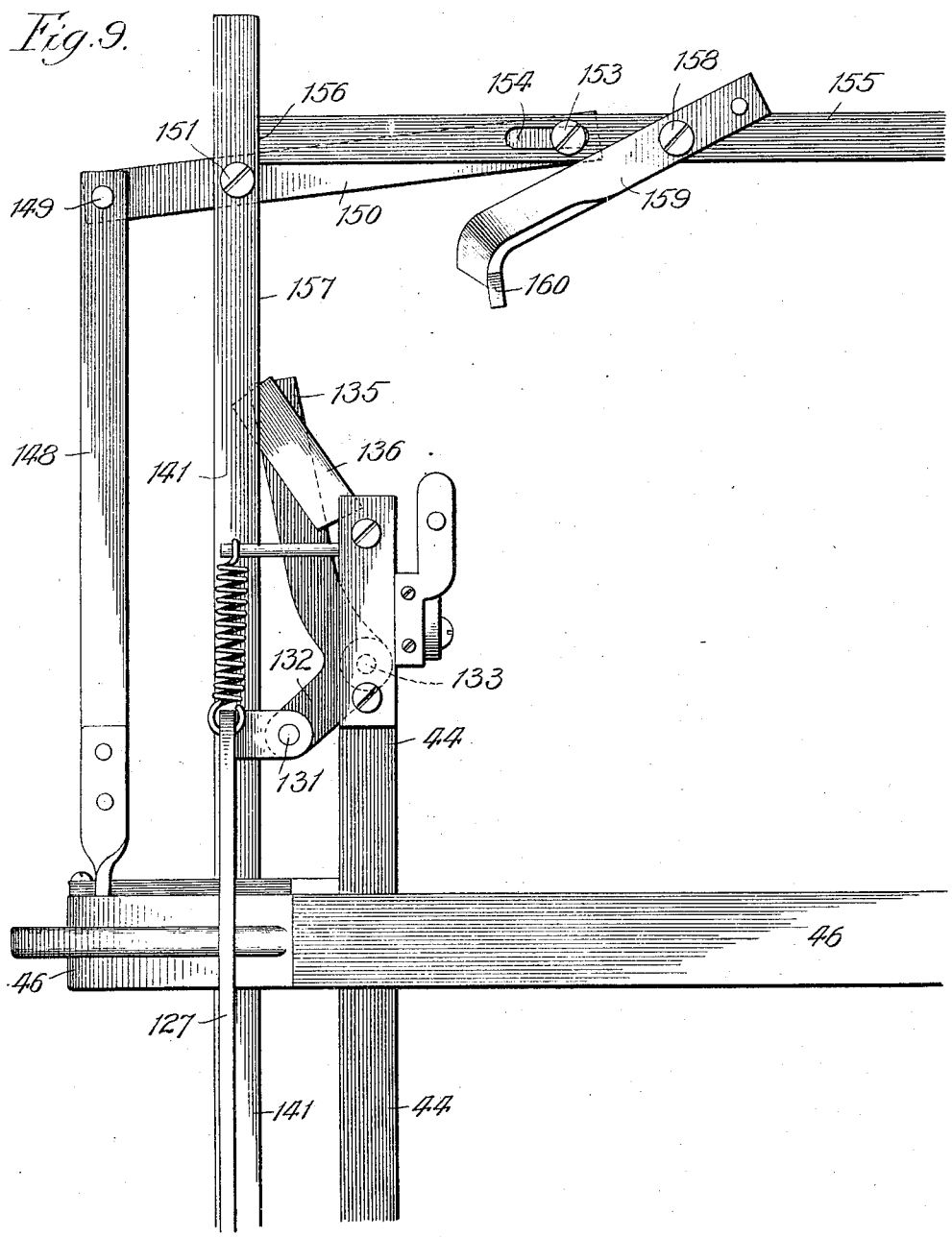

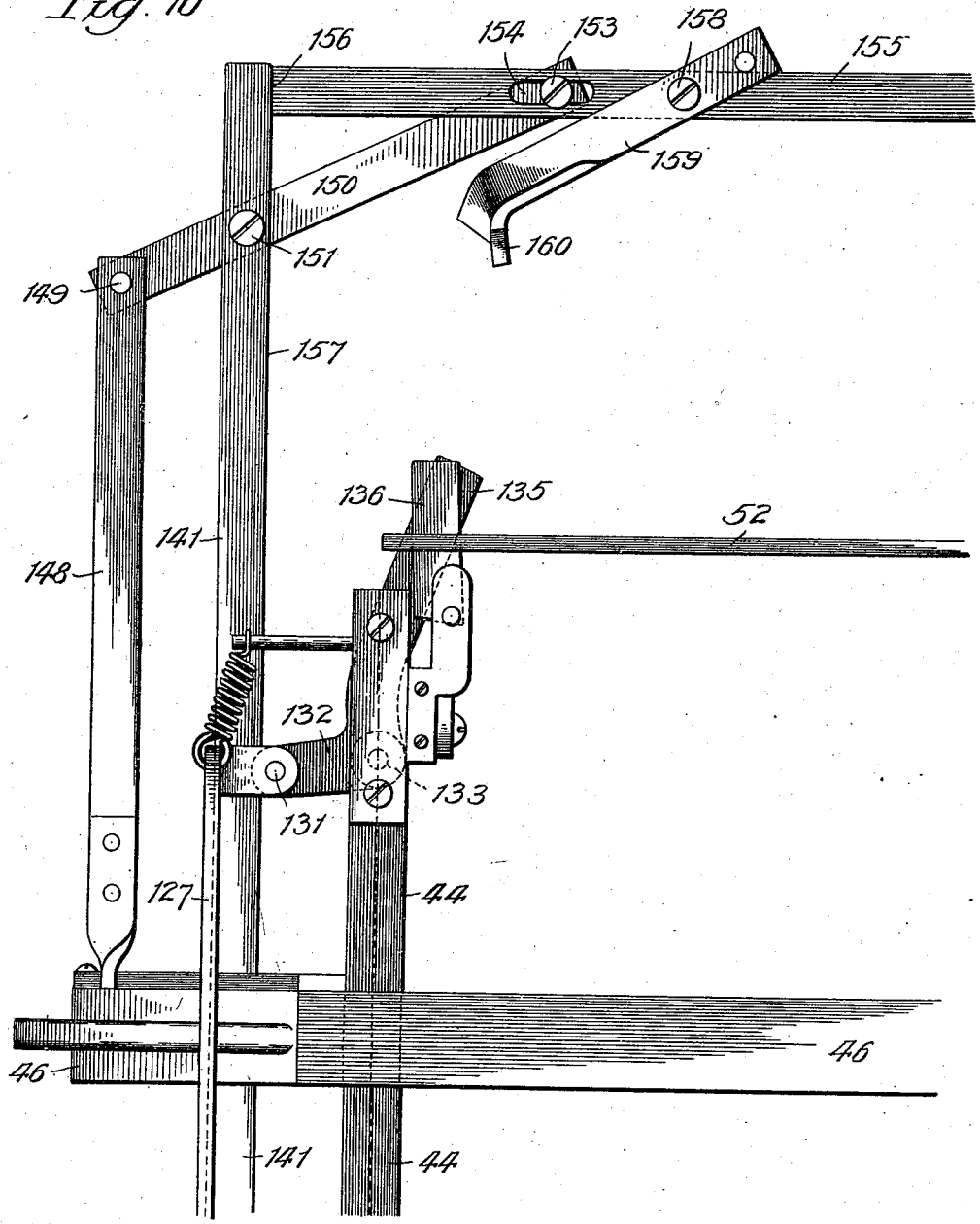

J. E. GILBERT.
SMUT SHEETING MACHINE.
APPLICATION FILED OCT. 30, 1905.

966,739.

Patented Aug. 9, 1910.
17 SHEETS—SHEET 9.

Witnesses:
Chas. E. Gaylord,
John Enders.

Inventor:
James E. Gilbert,
By Cheever Cox
Attys.

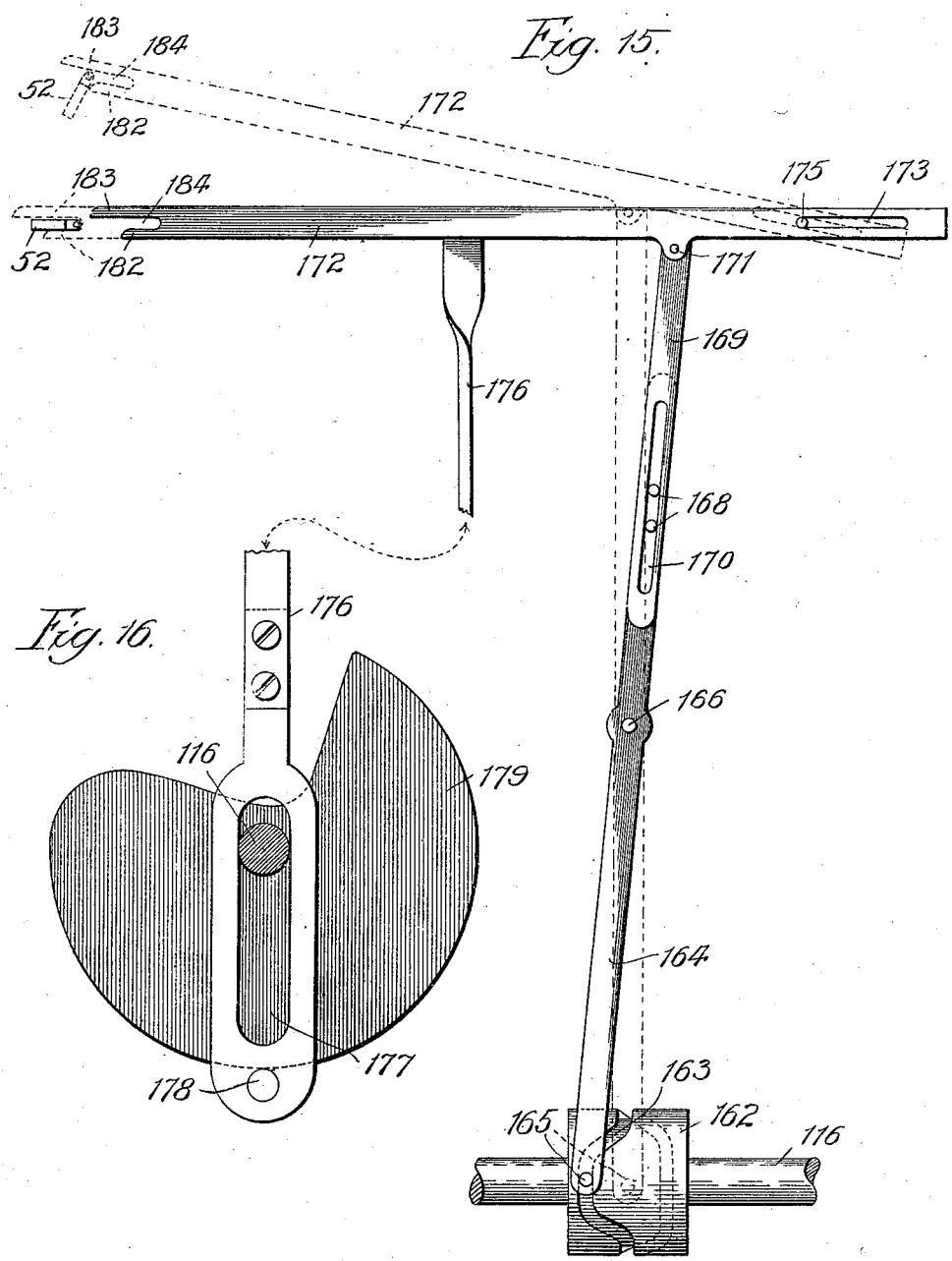

J. E. GILBERT.
SMUT SHEETING MACHINE.
APPLICATION FILED OCT. 30, 1905.
966,739.
Patented Aug. 9, 1910.
17 SHEETS—SHEET 11.
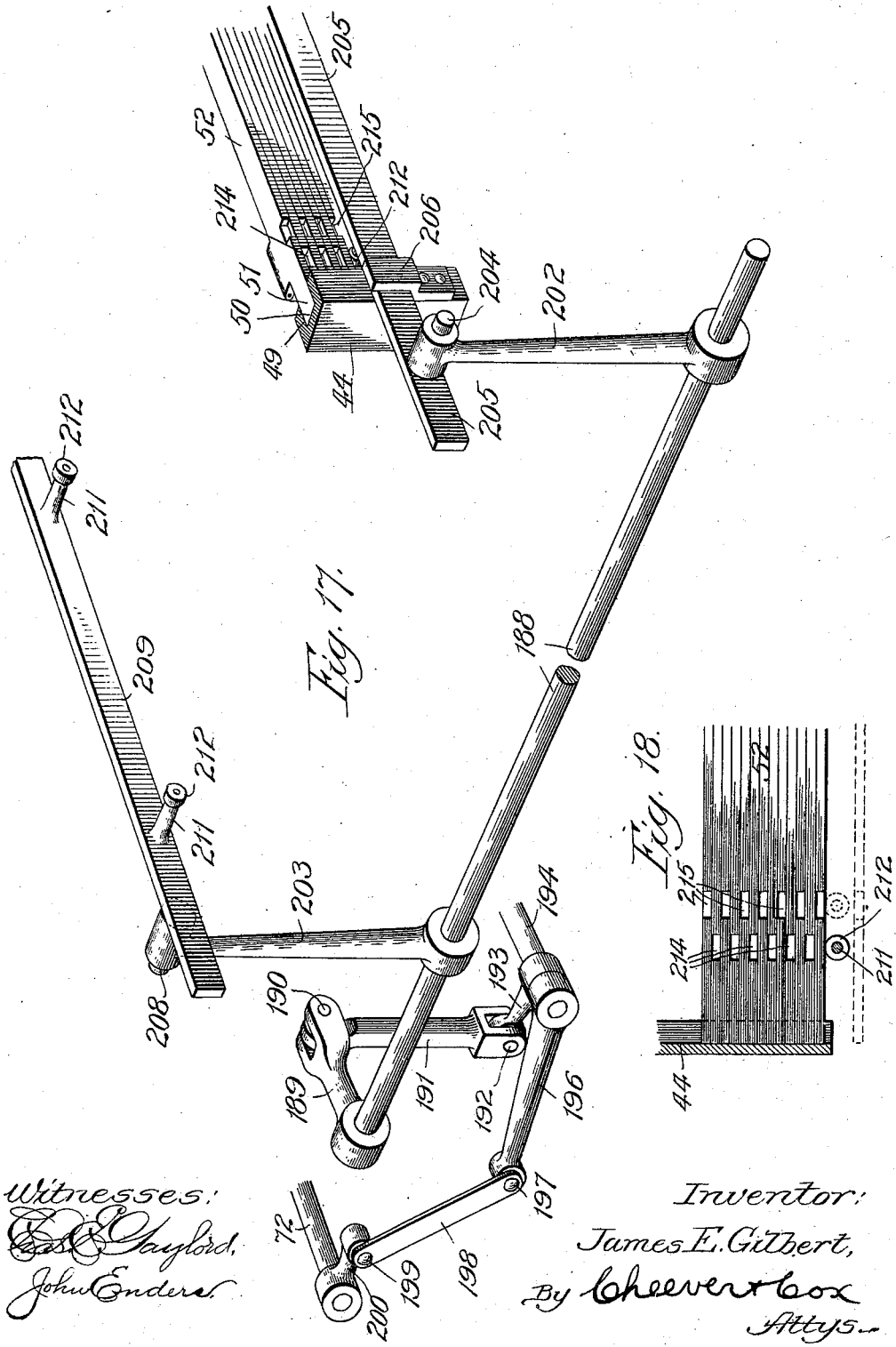

J. E. GILBERT.
SMUT SHEETING MACHINE.
APPLICATION FILED OCT. 30, 1905.

966,739.

Patented Aug. 9, 1910.
17 SHEETS—SHEET 12.

Witnesses:

Inventor:
James E. Gilbert,
By Cheever & Cox
Attys.

J. E. GILBERT.
SMUT SHEETING MACHINE.
APPLICATION FILED OCT. 30, 1905.

966,739.

Patented Aug. 9, 1910.
17 SHEETS—SHEET 13.

Witnesses:

Inventor:
James E. Gilbert,
By Cheever & Cox
Attys.

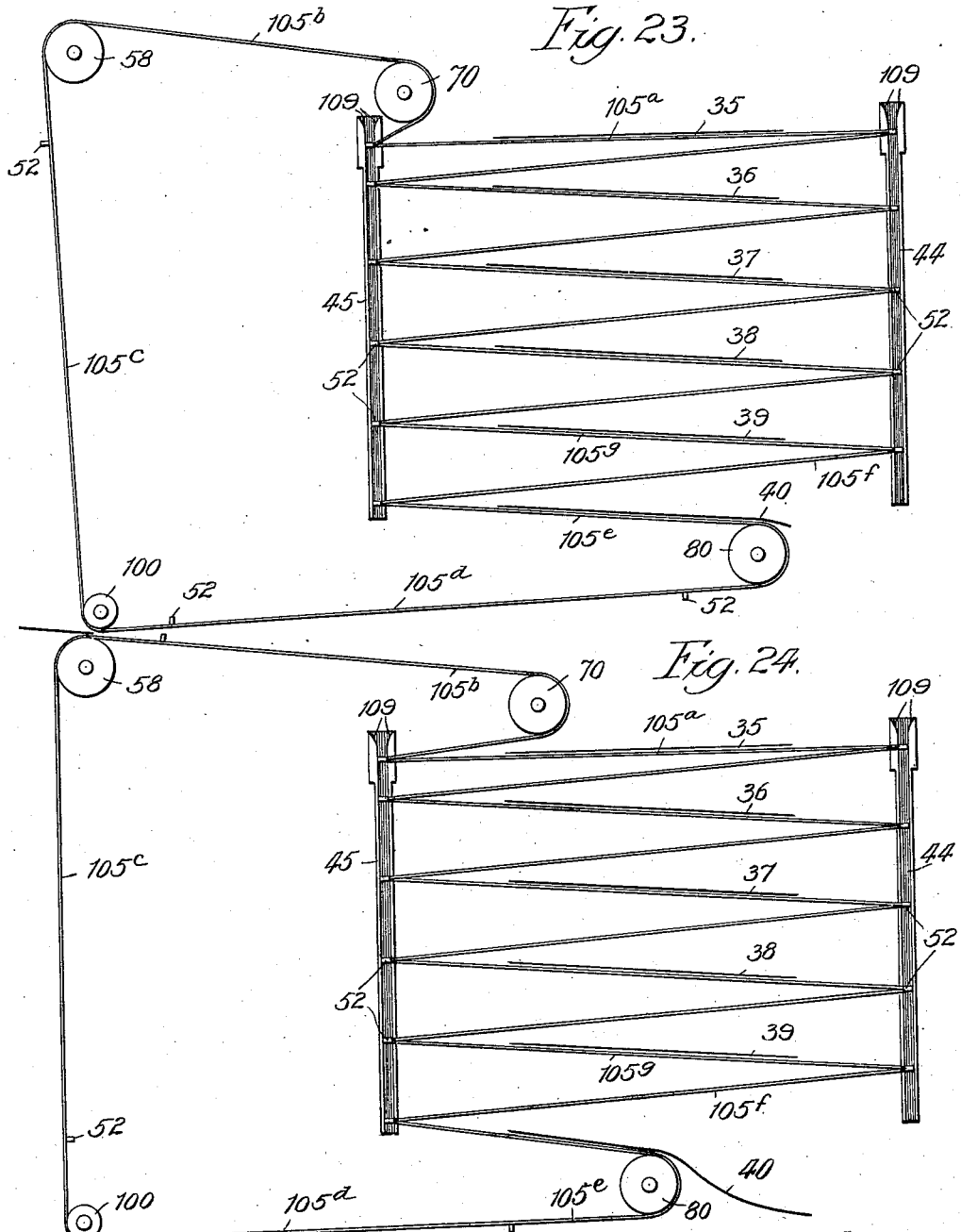

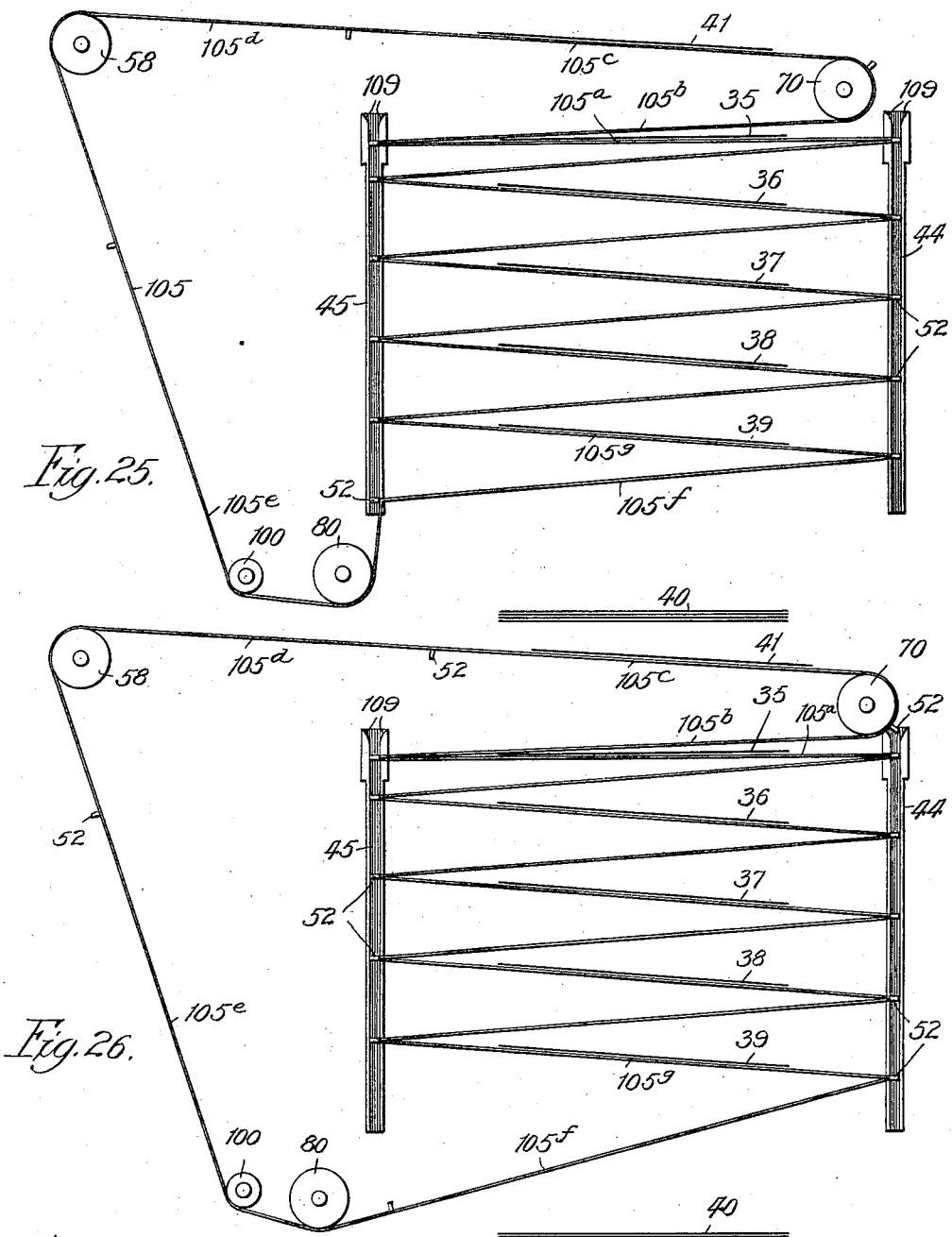

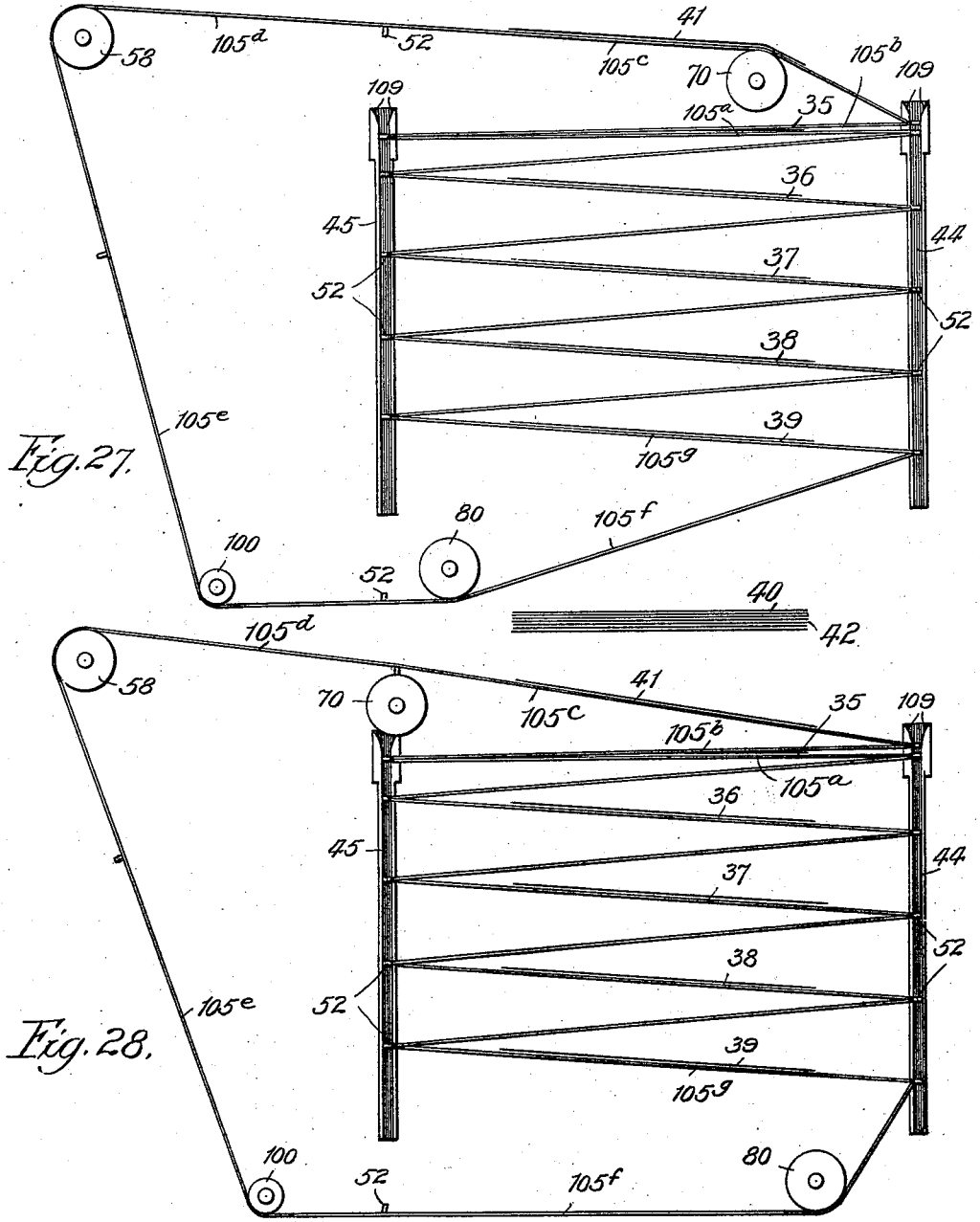

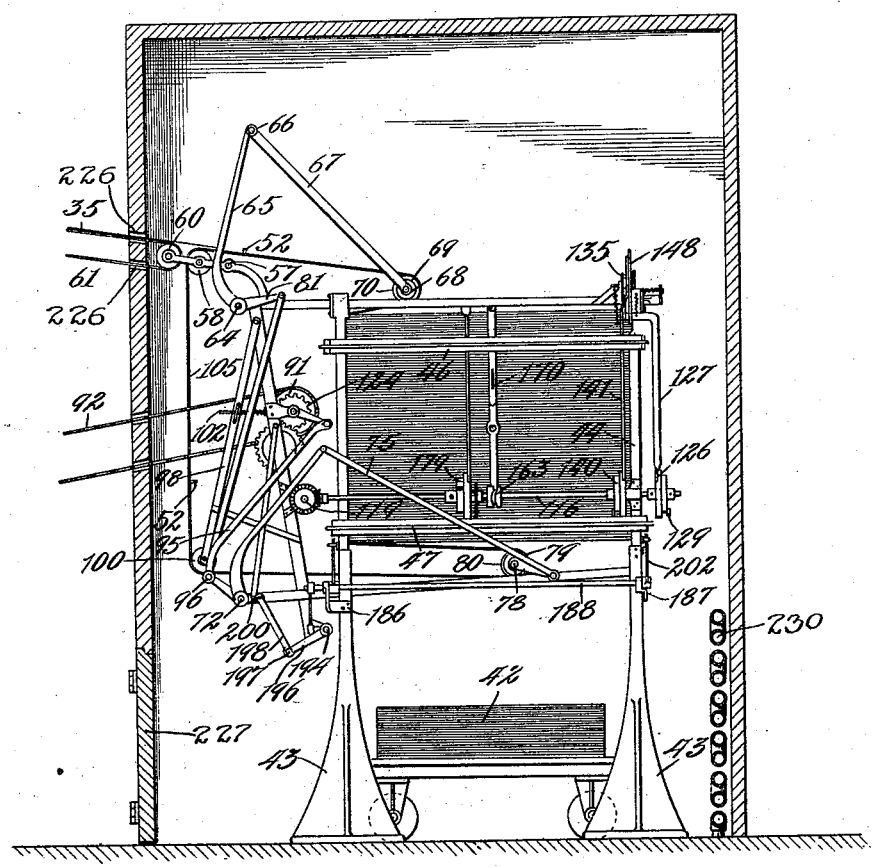

UNITED STATES PATENT OFFICE.

JAMES E. GILBERT, OF CHICAGO, ILLINOIS, ASSIGNOR, BY MESNE ASSIGNMENTS, TO GILBERT SLIP-SHEETING MACHINE COMPANY, OF CHICAGO, ILLINOIS, A CORPORATION OF ILLINOIS.

SMUT-SHEETING MACHINE.

966,739.      Specification of Letters Patent.      Patented Aug. 9, 1910.

Application filed October 30, 1905. Serial No. 285,195.

*To all whom it may concern:*

Be it known that I, JAMES E. GILBERT, a citizen of the United States, residing at Chicago, in the county of Cook and State of Illinois, have invented a certain new and useful Smut-Sheeting Machine, of which the following is a specification.

My invention relates to automatic delays for printed and lithographed sheets, or, in other words, to mechanism for taking care of such sheets of printed or lithographed matter between the time they receive the impression of the ink and the time that they are dried, so that they can be handled without injury.

When a lithographed or printed sheet is delivered from a press, its surface is in a moist condition, and if it is either handled directly or a successive printed or lithographed sheet is placed on it, there is a blotting, smearing, or smutting action, technically known as an "offset" from the freshly printed matter on the back of the next sheet of paper or other lithograph or print placed above it. Under the present practice, a force of workmen or girls is employed who first place sheets of paper, usually unglazed, hard brown Manila paper, very much like the paper frequently used by butchers for wrapping up fresh meat parcels, between the successive sheets of printed or lithographed matter. A pile of such printed or lithographed sheets with such other sheets interspersed between them is left for some little time, so that the ink upon the printed or lithographed sheets has time to dry, after which the pile is turned over to either the same, or, in a large plant, another set of workmen or girls, who proceed to take the lithographed or printed sheets one by one from this pile and place them upon a truck or other receptacle, and, at the same time, place the Manila sheets in another pile upon a truck or receptacle, after which the printed or lithographed sheets are ready for further treatment, either by re-printing with an additional color, or printing on the reverse side, or binding, or such use as may be desired. The Manila sheets thus taken from the composite pile are ready to be returned to the vicinity of the press to be used over again as other sheets are lithographed or printed upon the press. These Manila sheets do not perform a blotting function, but merely serve the purpose of preventing offset from the freshly printed or lithographed sheets which will not, under ordinary conditions, take place upon such paper as Manila paper, though it does take place very easily upon the highly finished glazed surface of the paper ordinarily used for printing illustrated work, and lithographing. These sheets of Manila or other paper, or material used for the purpose of this Manila paper just described, are known in the trade as "slip-sheets" or "smut-sheets", and, for convenience, such material whether it be paper, cloth, or other material capable of performing the functions described, will be referred to throughout the specification as "smut sheets" or "smut-sheet material".

The object of my invention is to provide an automatic machine by means of which successive portions of smut-sheet material are placed between the successive sheets of lithographed or printed matter, as they are delivered from the press this without the smut sheet rubbing the print sheet; each sheet of printed or lithographed material with the portion of smut-sheet material above it is then automatically moved out of the way of the successive sheets of lithographed or printed material delivered from the press, to a place or a succession of places in which the sheet of printed or lithographed matter in contact with the smut-sheet above it has time to dry sufficiently, so that it can be handled with safety as heretofore described, there being means provided by which, during this operation, the portion of smut-sheet in contact with the sheet of printed or lithographed matter does not move in relation or in reference to said sheet of printed or lithographed matter, whereby there is, during this operation, no danger of smutting or smearing of the print or lithograph upon the smut-sheet, or slurring the print or lithograph upon its own surface, or otherwise marring the printed or lithographed sheet; and mechanism for automatically separating the printed or lithographed sheet from the portion of smut-sheet material when the lithograph or print has had sufficient time to dry, so that it can be handled with safety as heretofore described:—this, also, in the preferred form, with means for then automatically returning the portions of smut-sheet material to a position where they can be again used in connection with another sheet of printed or lithographed matter as it is delivered by the press.

My invention consists broadly in a machine capable of performing these functions. In its preferred form, illustrated in the drawings, it consists in a continuous strip or belt of smut-sheet material adapted to be folded in successive, substantially parallel, sections, between which sheets of printed or lithographed matter are placed, in combination with means for moving successive folded sections of smut-material with the sheets of printed or lithographed matter between them away from the printing press, in such a way that there is no motion between the folds of smut-sheet material and the sheets of lithographed or printed matter between them, for a sufficient time for the ink upon the printed or lithographed sheets to dry in the manner heretofore described; also in combination with mechanism for then releasing the prints from the folds of the continuous belt or strip of smut-sheet material, and for returning the portion of the smut-sheet material belt which has been used, back to the position in the vicinity of the printing press delivery, where it can be used over again, for the same purpose.

The invention also consists in many advantages of the machine for causing it to perform the operations heretofore outlined, and in other features which will be made clear as the specification proceeds.

Figure 2:
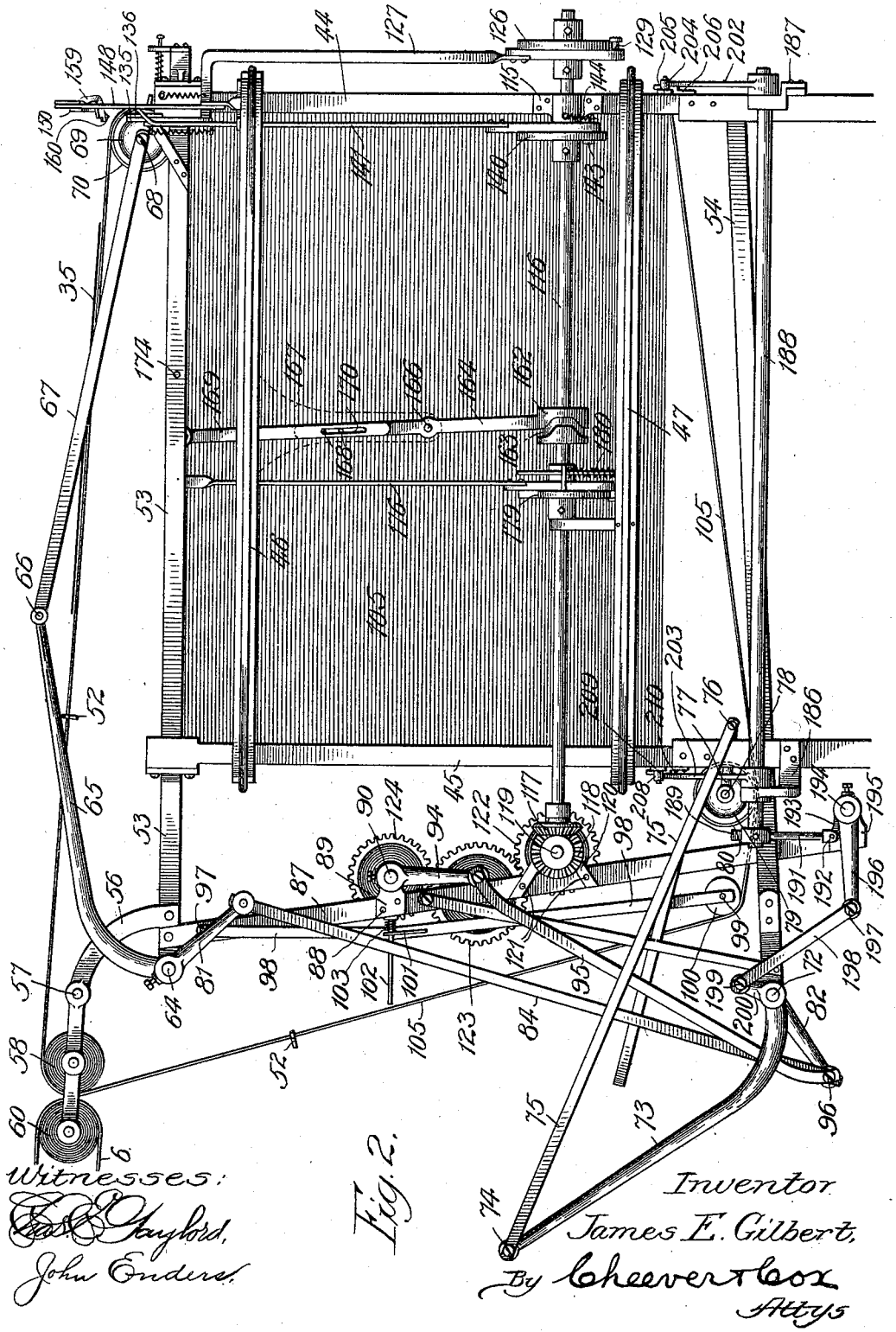
Figure 3:
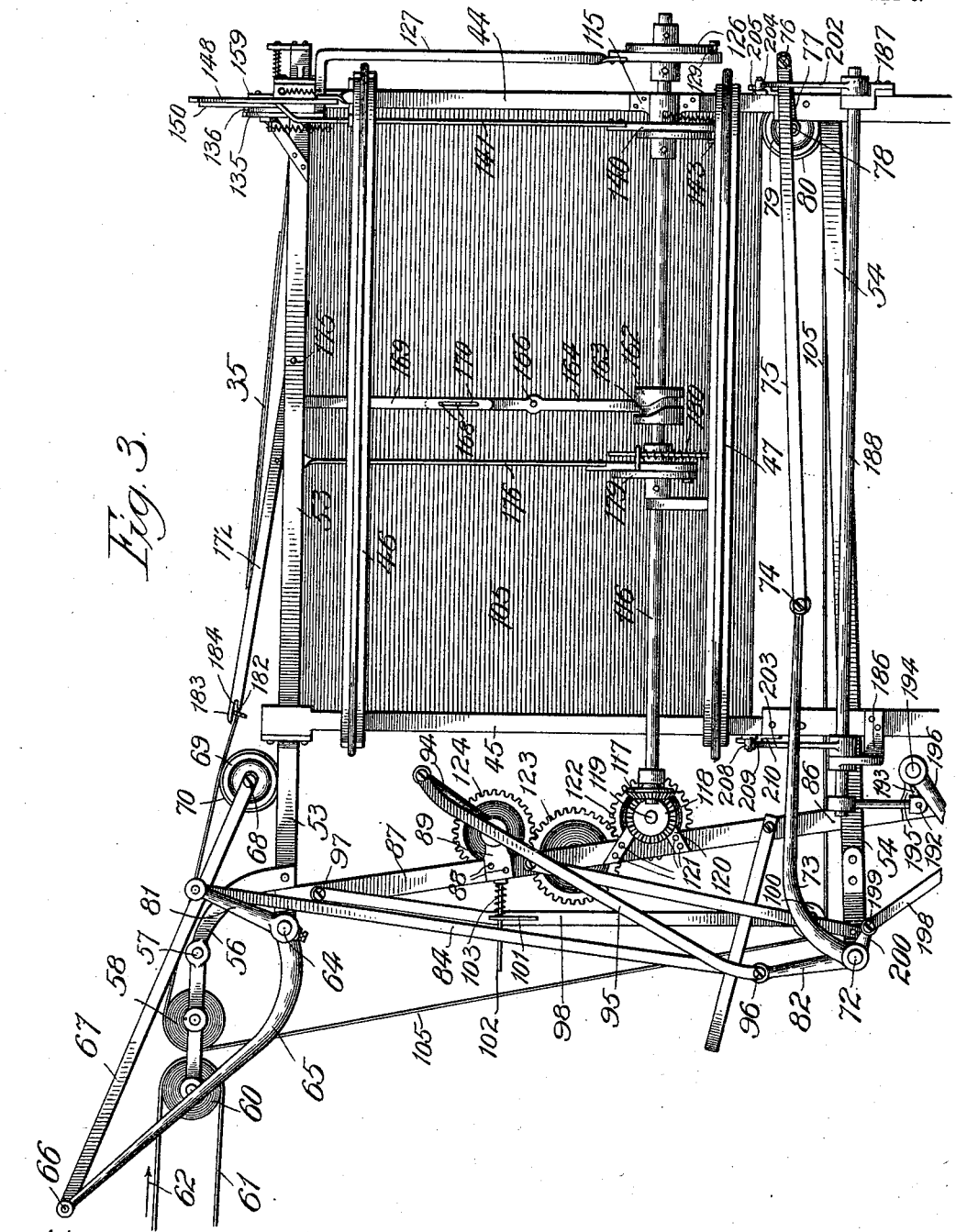
Figure 11:
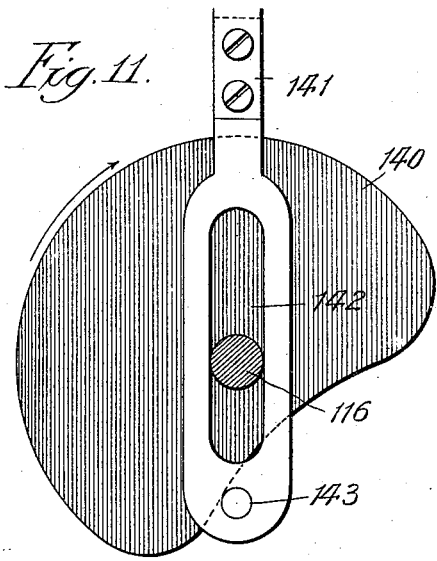
Figure 12:
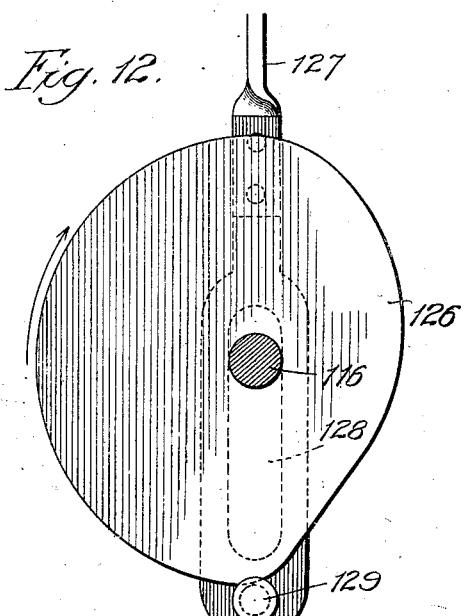
Figure 13:
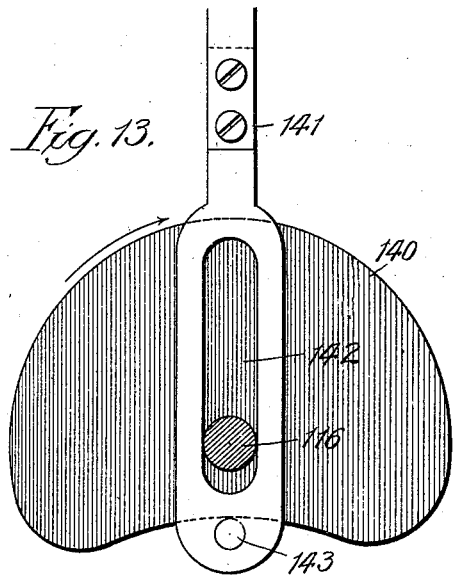
Figure 14:
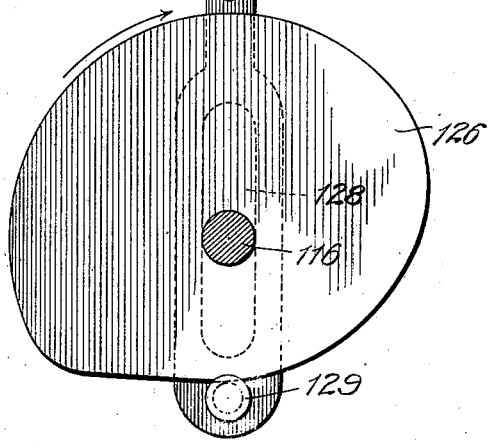
Figure 19:
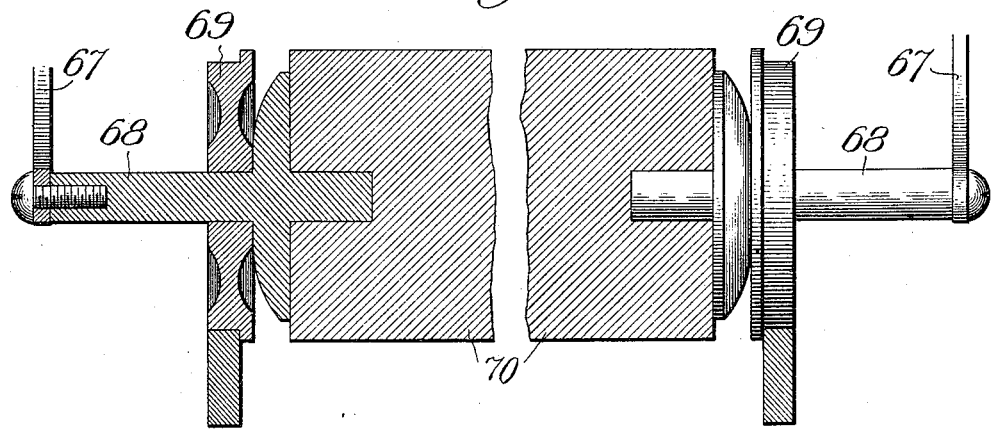
Figure 20:
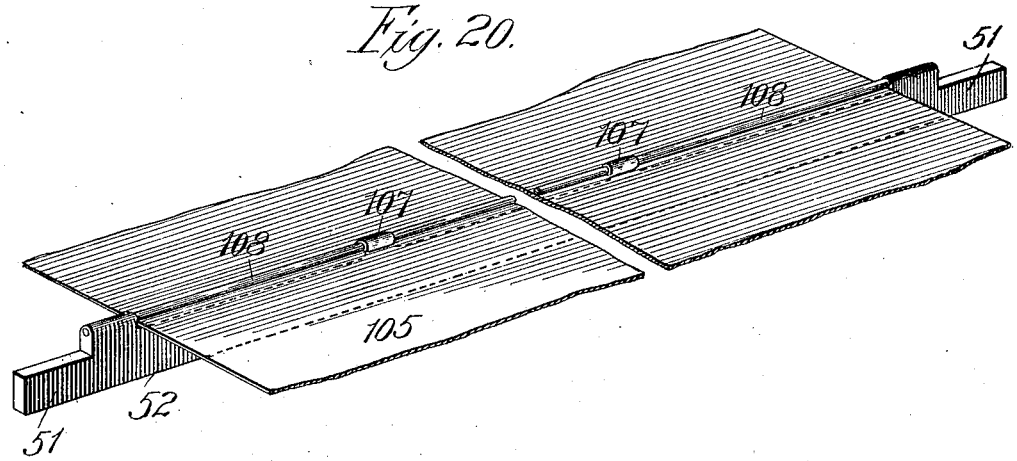

In the drawings which accompany this specification, and are a part thereof, Figure 1 is a side elevation of a machine embodying my invention in its preferred form, the parts being in the position in which a sheet of printed or lithographed material 35 is just being delivered to it from the printing press; Fig. 2 is a larger view, the standard on which the machine rests being omitted, showing the position of the parts when the sheet 35 is fully on the machine and ready to be dropped down into a position so that the succeeding portion of smut-sheet material which is to be placed over it can be so placed; Fig. 3 is the same view as Fig. 2, showing the position of the parts during the dropping-down motion just referred to. This action will be more clearly understood when Figs. 21 to 28 are described; Fig. 4 is a plan view of the parts in the position of Fig. 3; Fig. 5 is a front end view of the machine when the parts are in the position of Figs. 3 and 4; Fig. 6 is an enlarged detail view of the front feeding and locking mechanisms shown in assembled form in the upper portion of Fig. 5, the feeding mechanism being in the extreme downward position, and the locking mechanism being open ready to receive another bar; Fig. 7 is a face view of the cam for operating the feeding mechanism, showing the same in the extreme downward position corresponding to Fig. 6; Fig. 8 is a face view of the cam for operating the locking mechanism, showing the same in its unlocked position; Fig. 9 is a view similar to Fig. 6, showing the feeding mechanism raised from the position shown in Fig. 6 just prior to the closing of the locking mechanism; Fig. 10 is a similar view showing the feeding mechanism raised to its extreme height, and the locking mechanism in locked position; Fig. 11 is a face view of the cam of Fig. 7, showing it in the position which it assumes when the feeding mechanism is in the position of Fig. 9; Fig. 12 is a face view of the cam of Fig. 8, showing it in the position which it assumes when the locking mechanism is in the position of Fig. 9; Fig. 13 is a face view of the cam of Fig. 7 when it is in proper position so that the feeding mechanism attached to it is in the position of Fig. 10; Fig. 14 is a face view of the cam of Fig. 8, showing it when it is in such a position that the locking mechanism attached to it is in the position of Fig. 10; Fig. 15 is a detail side elevation of the rear feeding mechanism shown in assembled view in the center of Figs. 1, 2 and 3; Fig. 16 is a detail face view of the cam for operating the feeding mechanism shown in Fig. 15; Fig. 17 is a detail perspective of the releasing mechanism, appearing in assembled form in the lower left-hand portion in Figs. 1, 2 and 3; Fig. 18 is a detail sectional view through the channels supporting the bars attached to successive portions of smut-sheet material, in the manner hereafter described, showing such bars; Fig. 19 is a sectional elevation of the feeding roller for placing the sections of smut-sheet material over the sheets of printed or lithographed matter; Fig. 20 is a detail perspective view of portions of the smut-sheet material, showing the method of attaching a locking bar thereto; Figs. 21 to 28 are diagrammatic views showing various positions of the smut-sheet belt or strip, when the sheets of lithographed or printed material are being placed in the same, are in it, and are delivered from it, which will be more fully described at a later point in the specification. Fig. 29 shows the machine of this invention inclosed in a hot room so that the print sheets may be dried while they pass through the machine.

In the drawings I have heretofore referred to a sheet of paper which is coming on to the machine as being indicated by the numeral 35, and, for convenience, the same sheet of paper in its successive positions in passing through the machine will be referred to by the numerals 36, 37, 38, 39, 40 and 41, and the pile of lithographs and printed matter at the bottom of the machine by the numeral 42. (See particularly Figs. 21 to 28 inclusive.)

Rising from four base castings 43, made in any suitable form desired, are four upright channel irons, those at the front of the machine being indicated by the numeral 44, and those at the rear of the machine being indicated by the numeral 45. Surrounding these four channels 44 and 45, near their upper ends, is the rectangular frame 46. This frame is rigidly secured to the upper ends of these channel irons by any suitable means. Similarly inclosing the lower portions of these channel irons 44 and 45 near their lower ends where they are attached to the base castings 43 is a lower rectangular frame 47. In order to give rigidity to the whole frame composed of the parts heretofore described, diagonal braces 48, best shown in Fig. 5, are provided, secured either exactly as shown in the drawing, or to any upright and horizontal parts, as may be desired. For convenience, the drawings only show this bracing provided at the front of the machine. Similar bracing at other points of the frame is omitted in order to avoid confusing the drawings, but any amount of bracing may be provided to give the frame proper rigidity. The flanges 49 of the channel irons 44, heretofore described, face each other, and the flanges 49 of the channel-irons 45, heretofore described, face each other, as shown, from which it will readily be seen that the recesses 50 between the flanges of each pair of channel-irons face each other so that the ends 51 of the rods or bars 52 may slide up and down in such notches or recesses 50 between each pair of channel irons.

Rigidly secured to the upper ends of the channel-irons 44 and 45, heretofore described, but in a way not to obstruct these notches or recesses 50, heretofore referred to, are parallel, substantially horizontal, upper tracks 53; and similarly secured to the lower portion of the frame of the machine are two other parallel tracks 54. As shown in the drawings, these lower tracks 54 are slightly inclined, but this is not material to the invention. As shown, these two pairs of tracks 53 and 54 overhang the rear of the machine some little distance. Rigidly secured to the rear ends of the tracks 53 are brackets or hangers 56. The hangers 56 on opposite sides of the machine are rigidly secured together by a brace or tie-rod 57, this to give rigidity. Journaled in hangers 56, heretofore described, is an idle, freely rotatable roller 58. On the extreme ends of the brackets or hangers 56 is journaled another idle, freely rotatable roller 60. Over this last mentioned roller 60 there is a belt or tape 61 connected beyond the figure to the delivery of a printing press, and as this belt 61 is propelled by the printing press in the direction indicated by the arrow 62, paper delivered from the printing press is fed over the rollers 60 and 58 on to the machine of my invention.

Journaled in the extreme ends of the tracks 53 at the rear of the machine is a shaft 64. I rigidly secure to this shaft 64, by any suitable means, a pair of lever-arms 65, one of said lever-arms being at or near each end of the shaft 64 on each side of the machine. Pivotally connected to the outer ends of these lever-arms 64 by means of bolts or rivets 66 are two connecting rods 67. Connecting the opposite ends of these connecting rods 67 is a shaft 68, on which is mounted a pair of wheels 69 adapted to travel along the tracks 53; also mounted upon this shaft 68 is a feed-roller 70. These wheels 69 and the roller 70 should be free to rotate independently of each other. This may be accomplished by making the shaft 68 rigid with the connecting rods 67 and journaling both the wheels and the roller freely upon the shaft, or by securing the roller to the shaft and journaling the shaft in the connecting rods 67 and journaling the wheels upon the shaft, as desired. When the shaft 64 is rotated through a portion of its revolution and back again, the parts which have just been described will be moved so as to cause the roller 70 to move from the position shown in Fig. 3 to the position shown in Fig. 2, and back again. Similarly journaled at the extreme ends of the lower tracks 54, at the rear of the machine, is another shaft 72. Rigidly secured to this shaft is a pair of lever-arms 73 corresponding to the lever-arm 65 heretofore described. Journaled on pins or rivets 74 at the outer ends of these lever-arms 73 is a pair of connecting rods 75. Rigidly secured to the opposite ends of these connecting-rods 75 is a pair of short shafts 76 of such a length that they extend from the two sides of the machine in past the standards 43 or channels 44 and 45 to the plane of the lower tracks 54; and rigidly connected to the inner ends of these short shafts 76 are rods or bars 77 passing behind the frame of the machine in approximately the vertical planes of the tracks 54. Mounted in the ends of these short shafts 77 is a horizontal shaft 78, on which is mounted in the same manner that the wheel 69 and the roller 70 are mounted upon the shaft 68, a pair of wheels 79 and a delivery roller 80. From the foregoing, it will be seen that when the shaft 72 is given a partial rotation and back again, the delivery roller will be caused to travel from the position shown in Fig. 2 to the position shown in Fig. 3, and back again, the wheels 79 traveling and returning upon the tracks 54 during this operation.

Rigidly secured to the shaft 64, heretofore described, is a crank-arm 81; and similarly rigidly secured to the shaft 72, heretofore described, is another crank-arm 82 of substantially the same length as the crank-arm 81. The outer ends of these crank-arms are pivotally secured to the opposite ends of a connecting-rod 84, so that if either shaft 64 or 72 is moved, its motion will be communicated to the other shaft through this connecting-rod 84. The parts which have been described in the last three paragraphs are so arranged with reference to each other, that when the feed-roller 70 is at the rear of the machine, as shown in Fig. 3, the delivery-roller 80 is at the front of the machine; and that when the feed-roller is at the front of the machine, as shown in Fig. 2, the delivery-roller 80 is at the rear of the machine, as shown in that figure; the rollers being maintained in corresponding positions through the action of their operating parts by the connecting-rod 84, as described.

Rigidly secured to the rear ends of the tracks 53, between the fastenings of the brackets or hangers 56 and the shaft 64, and also rigidly secured at 86 to the rear portions of the lower tracks 54, is a pair of diagonal up-rights 87, the same being a portion of the frame of the machine. Rigidly secured upon these diagonal uprights 87, by bolts or rivets 88, are bearing castings 89, in which is journaled the main driving or power shaft 90 of the machine. Mounted upon this shaft 90 is a sprocket wheel 91, over which is a chain 92 connected beyond the figure to a source of power so that said source of power may drive the mechanism of my invention. Rigidly secured to the shaft 90 is a lever-arm 94, shorter than the lever-arms 81 and 82, heretofore described. The outer end of this lever-arm 84 is connected to one end of a connecting-rod 95. The opposite end of this connecting-rod 95 is connected to the pin 96 at the end of the lever-arm 82, heretofore described, to which pin the connecting-rod 84, heretofore described, is also connected. When, now, power is applied to the sprocket-chain 92 and the shaft 90 is thus rotated, the crank-arm 94 is also rotated continuously in a circle, thereby giving the lever-arm 82, which is longer than the crank-arm 94, a rocking motion so that the two rollers 70 and 80 are moved backward and forward between the positions of Fig. 2 and those of Fig. 3, as heretofore described. Pivoted on pins, bolts, or rivets 97, near the top of the diagonal up-rights 87, heretofore described, is a pair of depending lever-arms 98. Connecting the lower ends of these lever-arms 98 is a rod or shaft 99 on which is journaled an idle roller 100. On the sides of these lever-arms 98, near the middle of said arms, are lugs 101 having in them slots through which rods 102, rigidly secured to the bearing casting 89, pass. On these rods 102, between the castings 89 and the lugs 101, are springs 103 adapted to normally force the lugs 101, and, consequently, the lever-arms 98 and the roller 100 away from the diagonal uprights 87. I now provide a continuous strip or endless belt 105 of smut-sheet material. This may be of any suitable material. In practice I have found soft canvas satisfactory. This belt should be of sufficient length to pass around the rollers 70, 58, 100 and 80, and to zigzag back and forth between the vertical plane of the channel-irons 44 and the vertical plane of the channel-irons 45, as shown in Figs. 21 to 28 inclusive, a considerable number of times. In the machine from which these drawings are made, I have found upward of 300 such zigzags a desirable and satisfactory number; but this may be increased to one or more thousands, if desired. I divide this belt 105 into an even number of equal length sheets or portions, equal to the distance between the channel irons 44 and the channel irons 45, and at each such division-point secure thereto a bar 52 in the manner illustrated in Fig. 20, or by any suitable means. In the illustration of Fig. 20, this bar is fastened to the belt by having lugs 107 on the bar pass through the belt and a rod 108 pass through the lugs on the opposite side of the belt from the bar 52 proper, thereby securing the bar to the belt. These bars 52 are of such a length and their ends 51 are of such a width, that, as heretofore described, they fit into the recesses 50 between the flanges 49 of the channels 44 or the channels 45, and are adapted to slip downward through such recesses in the channels from the top to the bottom of the machine. The upper ends of the flanges 49 of the various channel-irons are flared outwardly in the curves 109, so that the ends of these bars may find ready entrance to the slots in the channels.

Alternate bars are placed upon the outside or upper portion of the belt 105, and engage only the channels 44; while the intermediate bars 52 are placed upon the opposite or inside portion of the belt and engage only the channels 45. Except for this distinction in the location of the bars, they are identical in construction.

Figure 21:
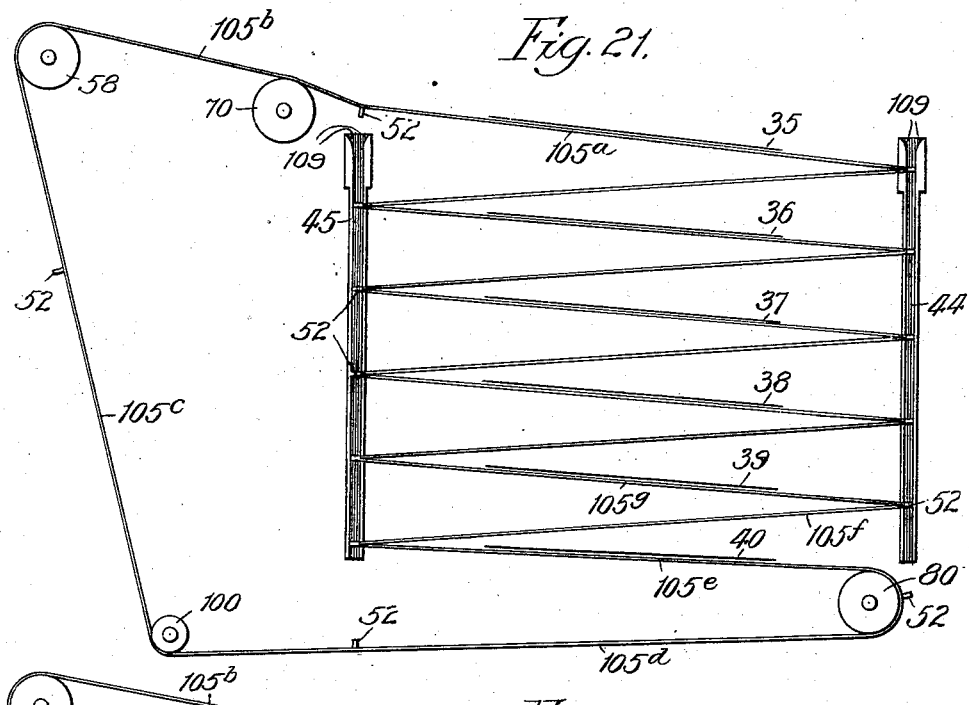

In putting the machine together at what will be for convenience termed the starting or normal position, this belt has a large pile of successive zigzags folded with the successive bars 52 in the respective channel-bars 44 and 45, as shown in Figs. 3, 4, and 5, the operation of the parts of the machine being as shown in those figures, and as diagrammatically shown in Fig. 21.

For clearness hereafter, the operation of the machine will now be described, particularly with reference to the diagrammatic Figs. 21 to 28 inclusive, leaving the description of further details as to the method of feeding the bars 52 into the channel-irons 44 and 45, and the method of releasing said bars at the bottoms of said channels, for later description.

Figure 22:
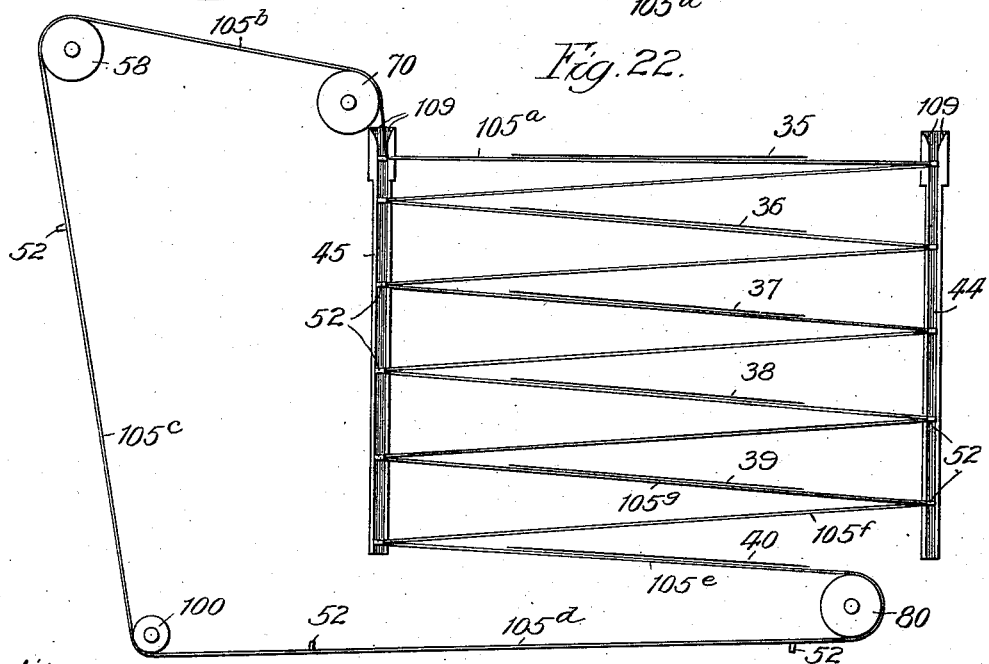

Assuming that the parts are in the position of Fig. 21, and that the shaft 90 is being continuously rotated, and that a sheet of paper 35 has been fed or placed upon the top fold or portion 105$^a$ of the belt 105, between the four channel irons 44 and 45 of Fig. 21, mechanism, which will be hereafter described, takes hold of the bar 52 which is over the channel-irons 45 and forces it downward into those channel-irons to the position of Fig. 22, the roller 70 at the same time advancing to the position 105$^b$ of the belt 105 over the sheet of paper 35. Mechanism, which will be hereafter described, now takes hold of the bar 52 which is over the channel-irons 44, in Fig. 26, and forces it down into said channel-irons to the position of Fig. 27, thereby locking it so that it cannot escape from the tops of said channel-irons. As soon as this is completed, the revolution of the machine causes the feed-roller 70 to travel toward and finally reach the position of Fig. 27, and ultimately the position of Fig. 28, from which it returns to the position of Fig. 21, when another sheet of paper 41 has been fed on to the portion 105$^c$ of the belt which is uppermost in Fig. 28, after which the mechanism returns to the position of Fig. 21, and the covering of this sheet of paper 41 by means of the portion of the belt 105$^d$ is executed in exactly the same manner. This operation is continued with successive sheets of printed or lithographed matter supplied to the machine, those which have come before it being, by mechanism which will be hereafter described, fed downward together with the successive sheets or portions of the smut-sheet belt 105, which it is between, into the machine. And, as heretofore described, I provide enough of these zigzag portions of the belt 105 so that the printed or lithographed sheets may remain between the folds or portions of the belt a sufficient time, so that they may dry enough to be handled with safety. As the successive folds are held by the bars 52 in the channels 44 and 45 so that they can only be moved by the uniform downward pressure of the folds of the belt with paper between them above, it will be seen that there is no lateral motion of the successive folds of the belt with reference to each other, or with reference to the printed or lithographed sheets between the folds, so that there is no danger of the lithographed or printed sheet being marred during this downward motion of the folds with the lithograph or print between them. Assuming, now, that this operation has been continued until the machine is full of printed or lithographed sheets, in which case sheet 40 of printed or lithographed matter will rest upon portion 105$^e$ of the belt 105, and be covered by the portion 105$^f$ of said belt, in Fig. 21. In this figure the delivery roller 80 is at the extreme forward position of its stroke. In this position, as shown in Fig. 21, mechanism which will be hereafter described, has just released the bar 52, which was in channel-irons 44, from this channel iron. As now the shaft 90 is rotated, as heretofore described, and the feeding operation is carried on, as heretofore described, the delivery roller 80 is moved successively to the positions of Figs. 22, 23, 24 and 25, during which time it has been wholly withdrawn from below the portion 105$^e$ of the belt, thereby allowing the sheet 40 of printed or lithographed material to gradually settle of its own weight on to the pile 42 of completely smutted or dried sheets of lithographed or printed material. When, now, the roller 80 has reached the position of Fig. 25, releasing mechanism, which will be hereafter described, releases the bottom bar 52 which is in the channel-irons 45, in Fig. 25, from said channel-irons and allows it to drop down to the position of Fig. 26. At this point the roller 80 is at the rear end of its stroke, and starts upon its forward stroke, during which it travels above the portion 105$^f$ of the belt 105 through the positions of Figs. 27 and 28 between which and the positions of Fig. 21 the bar 52 between portions 105$^f$ and 105$^g$ is released from the machine, and that bar takes the position of the lower bar, as shown in Fig. 21, and the operation is repeated. The belt 105 is kept under proper tension during this operation by the action of the spring 103 upon the lever-arm 98, tending to move the roller 100 from the rear of the machine.

It will be seen that, by the operations just described, each portion of the smut-sheet belt is successively folded into channel-irons, is passed downward through them, is finally released from them, and ultimately returned to its original position, ready to repeat these motions. It will also be seen that as the roller 70 feeds a portion of the smut-sheet belt 105 forward, the roller 80 simultaneously releases an equal portion of such belt at the bottom of the machine, so that only a small tension is required upon the roller 100 to keep the portion of the belt which is not in zigzag piles within the machine, in proper tension.

*Feeding and locking mechanism.*—Journaled upon the sides of the lower portion of the main frame of the machine, in castings 115, are two parallel shafts 116, bearing on their rear ends bevel pinions 117 which mesh with other bevel pinions 118 mounted upon a shaft 119 running across the back of the machine. This shaft 119 is journaled in a support 120 secured to the diagonal support 87, heretofore described, by bolts or rivets 121. On this shaft 119 is mounted a gearwheel 122 meshing with an idle gear wheel 123, suitably journaled at a point on the frame of the machine, so that it meshes with gear wheel 124 rigidly secured to the shaft 90, heretofore described, from which it will be seen that as the shaft 90 is rotated, as heretofore described, its motion will be communicated through the gears 124, 123, 122, and bevel gears 118 and 117 to the two shafts 116 on each side of the machine. These shafts drive the feeding and locking mechanism in the manner now to be described.

*The front locking mechanism.*—Rigidly secured to the front end of each of these two shafts 116 are two similar cams 126, shown in detail in Figs. 8, 12 and 14. Slidably mounted upon each shaft 116 is a vertical rod 127 having in its lower portion an elongated slot 128, through which the shaft 116 passes, as shown in the three figures last referred to. Journaled upon the lower end of each of these rods 127 is a cam roller 129 adapted to travel on the face of the cam 126 to which it is adjacent. These rollers 129 are held in contact with the cams 126 by suitable springs, such as that shown in Fig. 7, which will be hereafter described, the same being connected to the lower portions of the rods 127 and to the bearings for the shaft 116. The upper ends of these locking rods 127 are pivotally connected to the bolts, pins, or rivets 131 on the ends of the shorter arm 132 of a bell-crank pivoted at 133 to the upper portions of each channel-iron 44. The other arms of these bell-cranks are the parts marked 135 and extend upward, as shown. Rigidly secured to the upper ends of these bell-crank arms 135 are locking teeth 136 which are located in approximately the plane of the inner edges of the upright channel-irons 44, but extend far enough over that plane from the center lines of said channel-irons, so that when these locking teeth 136 are in locked position (as shown in Fig. 10), and as will be hereafter described, they hold the bars 52 in such a position that their ends are over the inside edge of the flaring portions 109 of the slots in the channel-irons, so that when the feeding mechanism, which will be hereafter described, bears down upon the bars 52 over the channel-irons 44, such feeding mechanism has no difficulty in forcing the ends of the bar 52 over the inner flared portions 109 of the channel-irons 44, into the slots 50 of the channel-irons. This location of the locking teeth 136, as just described, is clearly shown in the upper right-hand portion of Fig. 2.

The cams 126 are so located upon the shaft 116 that they hold the locking mechanism in the position shown in Figs. 6 and 9, during the time that the feed-roller 70 is traveling through the cycle of movements, heretofore described, except during the portion of such movements, when the roller is at the forward end of its stroke, as shown in Figs. 25 and 26 and in Fig. 2. When the roller 70, propelled in the manner heretofore described, approaches the forward end of its stroke, it carries a bar 52 attached to the smut-sheet belt 105 to the position shown in Fig. 3, where such bar 52 is over the slots in the channel-irons 44. As the feed-roller 70 reaches this position, the cams 126 start to move the locking mechanism from the position just described to the position of Fig. 10, the cam during this operation assuming the position of Fig. 14. As this occurs, the locking teeth 136 first bear lightly against the wheels 69 carrying the feed-roller 70, and as the roller 70 starts on its return motion, heretofore described, toward the rear of the machine, the teeth snap in behind the ends 51 of the bar 52 and hold it directly over the flaring portions 109 of the channel-irons 44, as heretofore described, thereby retaining the portion of smut-sheet material which is attached to the bar in the position to which it has been stretched by the forward motion of the feed-roller. The feeding mechanism, which will hereafter be described, now presses upon the bar and forces it down into the slots in the channel-irons. As soon as this occurs, there is no further need for the locking mechanism to operate and the cam 126 is so timed that as soon as this does occur it returns the locking mechanism to the open position shown in Figs. 6 and 9, where the parts are in a position in which they started ready to repeat the operation when another sheet of lithographed matter has been placed upon the machine, and another portion of the smut-sheet material has been folded over in the manner heretofore described.

*The front feeding mechanism.*—Rigidly secured to the shafts 116, heretofore described, behind the cams 126, heretofore described, are front feed cams 140. Rising from these cams 140 are vertical feed rods 141 having in their lower portions slots 142 which fit over the shafts 116, so that the rods may be guided by said slots in moving the rods up and down as will be hereafter described. On the lower ends of these feed-rods 141 are pins or rollers 143 adapted to travel on the faces of the cams 140. A pair of springs 144 having their upper ends connected at 145 to the bearing castings 115 on opposite sides of the machine, and their other ends connected to the lower ends of the rods 141, hold the rods 141 in such a position that the rollers 143 on their lower ends always bear against their respective cams 140.

Rising from the upper forward portion of the frame of the machine, at or near each front corner, is a vertical stationary support 148. Pivoted to the upper end of each of these supports on a pin or rivet 149 is a lever-arm 150. Each of these lever-arms 150 is pivotally connected by the pin, bolt or rivet 151 to the upper portion of one of the rods 141, heretofore described. The opposite end of each of these rods 150 carries a pin or bolt 153 which is adapted to travel backward and forward horizontally in an elongated slot 154 cut near each end of a horizontal bar 155 which extends across the front of the machine and is adapted to move up and down vertically of the machine, its ends 156 being guided by, and loosely bearing against, the inner edges 157 of the bars 141 heretofore described. Rigidly secured to this bar 155, at each side of the machine, by bolts or rivets 158 or other suitable means, are two feed-teeth 159 having their lower ends 160 so located that they lie in the plane of the slots 50 in the channel-irons 44—or, in other words, they are in the plane which the bars 52 are in when they are in the position of Fig. 2, ready to be shoved down into the slots in the channel-irons 44, in the manner heretofore suggested. All of the parts which have been just described are so proportioned and located and the cams 140 are so shaped and located, that, during the time the feed-roller 70 is at the front of the machine, as shown in Fig. 2, as heretofore described, this feeding mechanism is in the position shown in Figs. 9 and 10. When the roller 70 has reached the front of the machine and the bar 52 which has just been carried forward by it is locked by the locking mechanism just described, and the roller 70 begins to recede from the position of Fig. 2 toward the position of Fig. 3, the cam 140 then begins to move into the position of Fig. 7, and as this motion continues the feeding teeth 160 are depressed, thereby forcing the bar 52 which has been left by the receding feed-roller 70 in contact with the locking mechanism, as heretofore described, down into the slots in the vertical channels 44. As soon as the bar 52 has thus been forced down, thereby forcing the sheet of smut-sheet attached to it down to level position, as shown in Fig. 5, there is no further need for this feeding mechanism and the continued rotation of the shaft 116 causes the cam 140 to rotate on until it again assumes the position of Figs. 11 and 13 in which positions the feeding mechanism is in fully raised position so that it is out of the way of the feed-roller 70 as it approaches on its return stroke with another portion of smut-sheet material and another bar to be locked and fed into position.

*Rear feeding and locking mechanism.*— Rigidly secured upon each shaft 116, heretofore described, is a cam 162 having in its face a cam track 163 of such a shape that it will give a lever-arm 164 on which there is a pin or roller 165 which travels in the track 163, a motion toward and from the front of the machine, which will be hereafter described. This lever 164 is pivoted on a bearing 166 mounted upon a suitable casting 167 or other support attached to the main frame of the machine. Near the upper end of this rod 164 are two guide pins 168. Adjacent to the upper end of this rod 164 is an extension rod 169 having cut in its lower portion an elongated slot 170 adapted to fit over the guide pins 168 heretofore described, so that this extension-rod may be moved up and down along the rod 164, over the pins 168. Pivoted to the upper end of this extension-rod 169 on a pin 171 is a horizontal-rod 172, having in its rear end an elongated slot 173 adapted to fit over and travel upon a pin 175 attached to the track 53 to which the particular rod is adjacent, or, to some other suitable pin on the frame of the machine. Also rigidly secured to each of these horizontal-rods 172 there is a vertical rod 176 having on its lower end a slot 177 fitting over and adapted to slide upon the shaft 116 to which the particular rod is attached. On the lower end of each rod 176 is a pin 178 adapted to travel upon a cam 179, rigidly mounted upon the shaft 116. Each of these pins 178 is held in contact with the face of its cam 179 by a spring 180 corresponding to the springs 144 heretofore described. In the rear end of each horizontal-rod 172 (the end toward the rear of the machine), I cut a sort of a thumb 182 and a longer finger 183 separated by a notch 184, in which a bar 52 going into the rear channel-irons 45 is adapted to fit. I make this finger 183 longer than the thumb 182 for reasons which will be apparent hereafter. When, now, the shaft 116 is rotated, it rotates two cams, 162 and 179. The effect of the rotation of the cam 162 is, as heretofore described, to give the lever 164 a backward and forward motion, while the rotation of the cam 179 gives the vertical rod 176 an up and down motion, thereby giving the horizontal bar 172 an up and down motion about the pivot 171, except as the bar 172 is guided by its being slottedly attached to the pin 175. The resultant motion of the horizontal bar 172, under the action of these two cams, is in an ellipse which is at the rear end of the horizontal bar 172. These cams are so arranged that this ellipse is so shaped and timed with reference to the movements of the feed-roller 70, that the horizontal bar 172 serves to feed the bars 52 going to the channel-irons 45 into the slots in said channel-irons, and to hold them in position in the manner which will now be described.

When the roller 70 is in the position of diagrammatic Fig. 22, the horizontal bar 172 has just come down into extreme lower rear position, as shown by the dotted line extension on the end of the full-line horizontal bar 172 of Fig. 15, the bar 52 being horizontal and between the thumb 182 and finger 183, as shown. As the roller is traveling from the position of Fig. 22, through the positions of Figs. 23, 24, 25, 26, 27 and 28, and back to Fig. 21, the bar 172 is being withdrawn from the dotted line position, just described, to the horizontal full-line position of Fig. 15. During this time the horizontal bars 172 are below the tracks 53 and out of the way of the roller 70. When, now, the roller 70, in traveling to its extreme rear position, passes the channel-irons 45, as shown in Fig. 21, the cams 162 and 179 operating as described, cause the bars 172 to quickly move from the horizontal full-line position of Fig. 15 to the inclined dotted-line position of Fig. 15, and to press them toward the rear of the machine, so that, as shown in dotted lines in Fig. 15, and in full lines in Fig. 3, the fingers 183 pass over the upper portions of the ends of the depending bar 52 and the ends of the thumbs 182, striking against the side of said bar, thereby tending to tilt the depending bar upon its pivotal line 108 from the inclined position shown in Fig. 15 to the horizontal position shown in full-lines in Fig. 15; the bar passing into the slot 184 in the end of the inclined bar 172. As this action takes place the cams lower the rear ends of the bars 172 with the bar 52 in it, from the position shown in Fig. 21 into the position shown in Fig. 22, in which position the rear bars 52 are down in the slots 50 in the rear channel-irons 45, from which point we start.
As the bars 172 are thus held in their lower position for some time, they hold the bar 52 in the channel-iron against whatever tension there is exerted by the roller 70 as it comes forward, tending to pull said bar from the channel-irons 45, and, consequently, to disturb a portion of smut-sheet material attached to said bar 52, which has just been fed and locked into the channel-irons 45.

*Releasing mechanism.*—Along one side of the machine, and journaled in suitable bearings 186 and 187 is a shaft 188. On the rear side of this shaft is a crank-arm 189. Pivoted to the outer end of this crank-arm 189 on a pin or bolt 190 is a normally vertical rod 191 having its opposite end pivoted upon a pin or bolt 192 in the end of a short crank-arm 193 on a shaft 194 journaled in suitable bearings 195, mounted upon the diagonal brace 87, heretofore described. Extending from the end of this shaft 194 is a longer crank-arm 196, having at its end a pin or bolt 197 to which is connected one end of a diagonal rod 198. The upper end of this rod 198 is attached to a pin or bolt 199 on a short crank-arm 200, which is at- tached to the shaft 72, heretofore described. These parts are best shown in Fig. 17, from an inspection of which it will readily be seen that as the shaft 72 is rocked backward and forward through an arc of a circle, the lever-arm 200 will be correspondingly rocked, with the result that this motion will be transmitted through the parts which have just been described, to the shaft 188, and that it will, accordingly, partially rotate backward and forward through part of a circle. Rising from the front and rear portions of this shaft 188 are two lever-arms 202 and 203, which are given a correspondingly rocking motion as the shaft 188 is rocked in the manner described. On the upper end of the lever-arm 202, heretofore described, is journaled a pin 204, rigidly secured to a horizontal bar 205, extending across the front of the machine. This bar 205 rests slidably braced in brackets 206, attached to the lower portions of the channel-irons 44, so that as the lever-arm 102 is rocked, as heretofore described, the rod 205 will travel backward and forward across the front of the machine. Similarly attached to the upper end of the lever-arm 203 by means of a journaled pin 208 is a similar horizontal bar 209, slidably mounted in brackets or clips 210 attached at the rear of the machine to the channel-irons 45, so that as the lever-arm 203 is rocked, as heretofore described, this bar 209 travels backward and forward across the rear of the machine.

On the side of the bar 209, toward the front of the machine, are two pins 211 having on their outer ends rollers 212. Identical pins and rollers are on the side of the bar 205 extending toward the rear of the machine. These pins upon the bar 205 form a support at the bottom of the channel-irons 44 for the bars 42 in said channel-irons, as heretofore described, the lowest bar 52 in the pile resting directly upon the rollers 212 of the pins upon the bar 205. Similarly the pins 211 upon the bar 209 form supports for the bars 52 in the channel-irons 45, as heretofore described, the lowest bar resting directly upon the rollers 212 of said pins. I release the bars from both sets of channels by the following mechanism: In alternate bars which are to rest in the channel-irons 44, I cut notches or slots 214, as shown in Fig. 17, in such a position that they will be over the roller 212 on the bar 205, to which they are adjacent, when said bar is in one extreme position of its stroke heretofore described. Similarly, I cut in alternate bars 52 identical notches 215 which are in such a position that they are over and engage the roller 212 on the bar 205, to which they are adjacent, when said bar 205 is in the opposite extreme end of its stroke heretofore described. These notches 214 and 215 are of such a size that they will allow the bar 52 in which a particular notch is to go, to pass the roller 212 to which it is adjacent. The result of this construction is, that when the parts are in the position shown in Fig. 17 the roller 212 on the bar 205, shown in that figure, is in such a position that any one of the bars carrying a notch 214, which happens to be in direct contact with the roller 212, may pass downward past that roller, or, in other words, it is released from the channel iron 44, so that when this bar 52 is similarly and simultaneously released at its other end, it is free to drop from the position of Fig. 28 to the position of Fig. 21. When, however, the bottom bar is thus free to drop past the rollers 212 on the bar 205, said rollers then support the next bar, which contains notches 215, so that only the one bar containing the notches 214 is free to pass. When, now, the operation of the machine causes the shaft 108 to rock to its opposite position, the rollers 212 on the bar 205 are moved to a position in which, as heretofore described, they are directly below the notches 215 of the bar next above the one which was released on the former movement. When this position is reached, this second bar is free to pass the rollers, the notches 215 clearing said rollers in exactly the same manner that the first bar passed the rollers by means of the notches 214. It will be noted that in this position the rollers 214 bear against the next bar 52, which, as shown in Fig. 17, has a notch 214 therein, so that only the bar bearing the notch 215 can escape. When, now, in the operation of the machine, the bar 205 is moved back to its opposite position, it comes in register with the notches 214 in the bar 52, which, as just described, it has been supporting, and that bar is in turn at liberty to escape from the bottom of the channel-irons 44. The positions of the rollers 212 during this operation are also clearly illustrated in full line and dotted line positions of Fig. 18. On the rear of the machine, in the bars 52, which engage the channel-irons 45, there are similar notches engaging the rollers 212 on the bar 209, the same being so located that release will occur at the proper time to effect the cycle of movements of the smut-sheet, illustrated in Figs. 21 to 28 inclusive, and heretofore described. The front and back release are exactly alike, except as to the time when such releases take place, which is controlled by the location of the tripping or releasing devices just described.

For convenience, the words "print-sheet" will be used in the claims as indicating the sheet of printed, lithographed, or other matter, such as has been heretofore described in the specification; the words "smut-sheet" will be used as referring to the portion of smut-sheet material which is being used to smut-sheet the print-sheet and the word "support" will be applied to the portion of the belt on which the print sheet rests while the "smut sheet" is being placed over said "print sheet."

Attention is called to the fact, clearly apparent in Figs. 23, 24, 25 and 26 that the mechanism which folds or spreads the flexible smut sheet $105^b$ over the temporarily stationary print sheet 35 maintains it clear of the print sheet until the spreading operation is completed, that is, until bar 52 enters channels 44 when the stretched smut sheet falls directly upon the print sheet without any sidewise motion and consequently without smearing of the cut upon the print sheet.

This machine, heretofore described, may be inserted and run inside of an intensely heated chamber 225, which will dry the print-sheets while they are passing through the machine so that they may be used at once for binding; a dryness not contemplated in the ordinary use of the machine. It is impossible to work by hand in as hot a room as the machine could be placed in, so that I am thus able to obtain results in speed which have never before been possible. The only opening there need be in the room would be narrow slots 226 for the belt 35 carrying the wet print-sheet to pass through, and a door 227 to the chamber through which a truck bearing the final smut-sheets could be removed from time to time. Fig. 29 shows such an inclosing room heated by a suitable steam radiator 230.

Having thus described my invention, what I claim as new and desire to secure by Letters-Patent is:

1. In mechanism of the class described, in combination with a support for a print-sheet; a smut-sheet; and means for placing said smut-sheet in contact with a temporarily stationary print-sheet on said support.

2. In mechanism of the class described, in combination with a support for a print-sheet; a smut-sheet attached at one end of said support and normally not obstructing the same; and means for moving said smut-sheet to a position where it covers the print-sheet upon said support.

3. In mechanism of the class described, in combination with a support for a print-sheet; a smut-sheet; means for placing said smut-sheet in contact with the temporarily stationary print-sheet upon said support; and means for detachably securing said smut-sheet in contact with said print-sheet.

4. In mechanism of the class described, in combination with a support for a print-sheet; a smut-sheet attached to one end of said support and normally clear of the same; means for moving said smut-sheet to a position where it covers the print-sheet upon the support; and means for temporarily securing said smut-sheet in contact with the print-sheet.

5. In mechanism of the class described, in combination with a support for a print-sheet; a flexible smut-sheet; and means for placing said smut-sheet in contact with a temporarily stationary print-sheet on said support.

6. In mechanism of the class described, in combination with a support for a print-sheet; a flexible smut-sheet; and means for bending said flexible smut-sheet into contact with a temporarily stationary print-sheet on said support.

7. In mechanism of the class described, in combination with a support for a print-sheet; a flexible smut-sheet; and a roller adapted to move over said support and place said smut-sheet in contact with a print-sheet on said support.

8. In mechanism of the class described, in combination with a support for a print-sheet; a flexible smut-sheet; means for placing said smut-sheet in contact with a temporarily stationary print-sheet on said support; and mechanism for temporarily securing said smut-sheet in contact with said print-sheet.

9. In mechanism of the class described, in combination with a support for a print-sheet; a flexible smut-sheet; means for bending said flexible smut-sheet into contact with a temporarily stationary print-sheet on said support; and mechanism for temporarily securing said smut-sheet in contact with said print-sheet.

10. In mechanism of the class described, in combination with a support for a print-sheet; a flexible smut-sheet; a roller adapted to move over said support and place said smut-sheet in contact with a print-sheet on said support; and mechanism for temporarily securing said smut-sheet in contact with said print-sheet.

11. In mechanism of the class described, in combination with a support for a print-sheet; a flexible smut-sheet attached to one end of said support normally clear of said support; and means for moving said flexible smut-sheet to a position where it covers a print-sheet upon said support.

12. In mechanism of the class described, in combination with a support for a print-sheet; a flexible smut-sheet attached to one end of said support normally clear of said support; and mechanism for gradually bending said smut-sheet to a position where it covers a print-sheet upon the support.

13. In mechanism of the class described, in combination with a support for a print-sheet; a flexible smut-sheet attached to one end of said support normally clear of the same; and a roller adapted to be moved over the surface of said support to bend said flexible smut-sheet to a position where it covers a print-sheet upon said support.

14. In mechanism of the class described, in combination with a support for a print-sheet; a flexible smut-sheet attached to one end of said support normally clear of said support; means for moving said flexible smut-sheet to a position where it covers a print-sheet upon said support; and mechanism for then temporarily securing said smut-sheet in contact with said print-sheet.

15. In mechanism of the class described, the combination with a support for a print-sheet; a flexible smut-sheet attached to one end of said support normally clear of said support; mechanism for gradually bending said smut-sheet to a position where it covers a print-sheet upon the support; and mechanism for then temporarily securing said smut-sheet in contact with said print-sheet.

16. In mechanism of the class described, in combination with a support for a print-sheet; a flexible smut-sheet attached to one end of said support normally clear of the same; a roller adapted to be moved over the surface of said support to bend said flexible smut-sheet to a position where it covers a print-sheet upon said support; and mechanism for then temporarily securing said smut-sheet in contact with said print-sheet.

17. In mechanism of the class described, in combination with a suitable supporting-frame; a movable support for a print-sheet; a smut-sheet; means for moving of said smut-sheet by gravity over a temporarily stationary print-sheet upon said support; and guiding mechanism by which said print-sheet support and said smut-sheet move by gravity to a different part of the machine without either moving with reference to the other.

18. In mechanism of the class described, in combination with a suitable supporting frame; a movable support for a print-sheet; a smut-sheet; means for placing said smut-sheet over a temporarily stationary print-sheet upon said print-sheet support; means for moving said print-sheet support and said smut-sheet to a different part of the machine; and mechanism for preventing movement of said support and said smut-sheet with reference to each other during said last mentioned movement.

19. In mechanism of the class described, in combination with a suitable supporting frame, a support for a print-sheet slidably mounted in said supporting frame; a smut-sheet; means for moving said smut-sheet into contact with a print-sheet upon said print-sheet support; means for securing said smut-sheet in contact with the said print-sheet support; and means for then moving said print-sheet support with the smut-sheet upon it along its slidable support in the main frame without moving said smut-sheet with reference to said print-sheet support.

20. In mechanism of the class described, in combination with a suitable supporting frame containing vertical guides; a support for a print-sheet so mounted that it can slide in said vertical guides in the main frame of the machine; a smut-sheet; means for moving said smut-sheet into contact with a print-sheet placed upon said print-sheet support; and means for then moving said print-sheet support and said smut-sheet in said guides in the machines without moving said smut-sheet with reference to said print-sheet support during said last-mentioned movement.

21. In mechanism of the class described, in combination with a suitable supporting frame containing vertical guides; a support for a print-sheet so mounted that it can slide in said vertical guides in the main frame of the machine; a smut-sheet; means for moving said smut-sheet into contact with the print-sheet placed upon said print-sheet support; mechanism for slidably securing said smut-sheet in said guides in the main frame of the machine; and means for then simultaneously moving said print-sheet support and said smut-sheet downward in the guides in the main frame.

22. In mechanism of the class described, in combination with a suitable supporting frame; a movable support for a print-sheet; a flexible smut-sheet; means for moving said flexible smut-sheet over a temporarily stationary print-sheet upon said support; and mechanism for then moving said print-sheet support and said smut-sheet to a different part of the machine without moving either with reference to the other.

23. In mechanism of the class described, in combination with a suitable supporting frame; a movable support for a print-sheet; a flexible smut-sheet; means for placing said flexible smut-sheet over a temporarily stationary print-sheet upon said print-sheet support; means for moving said print-sheet support and said flexible smut-sheet to a different part of the machine; and mechanism for preventing movement of said support and said flexible smut-sheet with reference to each other during said last mentioned movement.

24. In mechanism of the class described, in combination with a suitable supporting frame; a support for a print-sheet slidably mounted in said supporting frame; a flexible smut-sheet; means for moving said flexible smut-sheet into contact with a print-sheet upon said print-sheet support; means for securing said flexible smut-sheet in contact with the said print-sheet support; and means for then moving said print-sheet support with the flexible smut-sheet upon it along its slidable support in the main frame without moving said flexible smut-sheet with reference to said print-sheet support.

25. In mechanism of the class described, in combination with a suitable supporting frame containing vertical guides; a support for a print-sheet so mounted that it can slide in said vertical guides in the main frame of the machine; a flexible smut-sheet; means for moving said flexible smut-sheet into contact with a print-sheet placed upon said print-sheet support; and means for then moving said print-sheet support and said flexible smut-sheet in said guides in the machine without moving said flexible smut-sheet with reference to said print-sheet support during said last-mentioned movement.

26. In mechanism of the class described, in combination with a suitable suporting frame containing vertical guides; a support for a print-sheet so mounted that it can slide in said vertical guides in the main frame of the machine; a flexible smut-sheet; means for moving said flexible smut-sheet into contact with a print-sheet placed upon said print-sheet support; mechanism for slidably securing said flexible smut-sheet in said guides in the main frame of the machine; and means for then simultaneously moving said print-sheet support and said flexible smut-sheet downward in the guides in the main frame.

27. In mechanism of the class described, in combination with a suitable supporting frame; a movable support for a print-sheet; a smut-sheet; means for moving said smut-sheet over a print-sheet upon said support; mechanism for then moving said print-sheet support and said smut-sheet to a different part of the machine without moving either with reference to the other; and mechanism for finally removing said print-sheet support from contact with said smut-sheet and from said print-sheet.

28. In mechanism of the class described, in combination with a suitable supporting frame; a movable support for a print-sheet; a smut-sheet; means for placing said smut-sheet over a print-sheet upon said print-sheet support; means for moving said print-sheet support and said smut-sheet to a different part of the machine; mechanism for preventing movement of said support and said smut-sheet with reference to each other during said last mentioned movement; and mechanism for finally removing said print-sheet support from contact with said smut-sheet and from said print-sheet.

29. In mechanism of the class described, in combination with a suitable supporting frame; a support for a print-sheet slidably mounted in said supporting-frame; a smut-sheet; means for moving said smut-sheet into contact with a print-sheet upon said print-sheet support; means for securing said smut-sheet in contact with the said print-sheet support; means for then moving said print-sheet support with the smut-sheet upon it along its slidable support in the main frame without moving said smut-sheet with reference to said print-sheet support; and mechanism for finally removing said print-sheet support from contact with said smut-sheet and from said print-sheet.

30. In mechanism of the class described, in combination with a suitable supporting frame containing vertical guides; a support for a print-sheet so mounted that it can slide in said vertical guides in the main frame of the machine; a smut-sheet; means for moving said smut-sheet into contact with a print-sheet placed upon said print-sheet support; means for then moving said print-sheet support and said smut-sheet in said guides in the machine without moving said smut-sheet with reference to said print-sheet support during said last-mentioned movement; and mechanism for finally removing said print-sheet support from contact with said smut-sheet and from said print-sheet.

31. In mechanism of the class described, in combination with a suitable supporting frame containing vertical guides; a support for a print-sheet so mounted that it can slide in said vertical guides in the main frame of the machine; a smut-sheet; means for moving said smut-sheet into contact with a print-sheet placed upon said print-sheet support; mechanism for slidably securing said smut-sheet in said guides in the frame of the machine; means for then simultaneously moving said print-sheet support and said smut-sheet downward in the guides in the main frame; and mechanism for finally removing said print-sheet support from contact with said smut-sheet and from said print-sheet.

32. In mechanism of the class described, in combination with a suitable supporting frame; a movable support for a print-sheet; a flexible smut-sheet; means for moving said flexible smut-sheet over a print-sheet upon said support; mechanism for then moving said print-sheet and said smut-sheet to a different part of the machine without moving either with reference to the other; and mechanism for finally removing said print-sheet support from contact with said smut-sheet and from said print-sheet.

33. In mechanism of the class described, in combination with a suitable supporting frame; a movable support for a print-sheet; a flexible smut-sheet; means for placing said flexible smut-sheet over a print-sheet upon said print-sheet support; means for moving said print-sheet support and said flexible smut-sheet to a different part of the machine; mechanism for preventing movement of said support and said flexible smut-sheet with reference to each other during said last-mentioned movement; and mechanism for finally removing said print-sheet support from contact with said smut-sheet and from said print-sheet.

34. In mechanism of the class described, in combination with a suitable supporting frame; a support for a print-sheet slidably mounted in said supporting frame; a flexible smut-sheet; means for moving said flexible smut-sheet into contact with a print-sheet upon said print-sheet support; means for securing said flexible smut-sheet in contact with the said print-sheet support; means for then moving said print-sheet support with the flexible smut-sheet upon it along its slidable support in the main frame without moving said flexible smut-sheet with reference to said print-sheet support; and mechanism for finally removing said print-sheet support from contact with said smut-sheet and from said print-sheet.

35. In mechanism of the class described, in combination with a suitable supporting frame containing vertical guides; a support for a print-sheet so mounted that it can slide in said vertical guides in the main frame of the machine; a flexible smut-sheet; means for moving said flexible smut-sheet into contact with a print-sheet placed upon said print-sheet support; means for then moving said print-sheet support and said flexible smut-sheet in said guides in the machine without moving said flexible smut-sheet with reference to said print-sheet support during said last mentioned movement; and mechanism for finally removing said print-sheet support from contact with said smut-sheet and from said print-sheet.

36. In mechanism of the class described, in combination with a suitable supporting frame containing vertical guides; a support for a print-sheet so mounted that it can slide in said vertical guides in the main frame of the machine; a flexible smut-sheet; means for moving said flexible smut-sheet into contact with a print-sheet placed upon said print-sheet support; mechanism for slidably securing said flexible smut-sheet in said guides in the main frame of the machine; means for then simultaneously moving said print-sheet support and said flexible smut-sheet downward in the guides in the main frame; and mechanism for finally removing said print-sheet support from contact with said smut-sheet and from said print-sheet.

37. In mechanism of the class described, in combination with a suitable supporting frame; a movable support for a print-sheet; a smut-sheet; means for moving said smut-sheet over a print-sheet upon said support; mechanism for then moving said print-sheet support and said smut-sheet to a different part of the machine without moving either with reference to the other; mechanism for finally removing said print-sheet support from contact with said smut-sheet and from said print-sheet; and means for returning said print-sheet support and said smut-sheet to their original positions in the machine.

38. In mechanism of the class described, in combination with a suitable supporting frame; a movable support for a print-sheet; a smut-sheet; means for placing said smut-sheet over a print-sheet upon said print-sheet support; means for moving said print-sheet support and said smut-sheet to a different part of the machine; mechanism for preventing movement of said support and said smut-sheet with reference to each other during said last mentioned movement; mechanism for finally removing said print-sheet support from contact with said smut-sheet and from said print-sheet; and means for returning said print-sheet support and said smut-sheet to their original positions in the machine.

39. In mechanism of the class described, in combination with a suitable supporting frame; a support for a print-sheet slidably mounted in said supporting frame; a smut-sheet; means for moving said smut-sheet into contact with a print-sheet upon said print-sheet support; means for securing said smut-sheet in contact with the said print-sheet support; means for then moving said print-sheet support with the smut-sheet upon it along its slidable support in the main frame without moving said smut-sheet with reference to said print-sheet support; mechanism for finally removing said print-sheet support from contact with said smut-sheet and with said print-sheet; and means for returning said print-sheet support and said smut-sheet to their original positions in the machine.

40. In mechanism of the class described, in combination with a suitable supporting frame containing vertical guides; a support for a print-sheet so mounted that it can slide in said vertical guides in the main frame of the machine; a smut-sheet; means for moving said smut-sheet into contact with a print-sheet placed upon said print-sheet support; means for then moving said print-sheet support and said smut-sheet in said guides in the machine without moving said smut-sheet with reference to said print-sheet support during said last-mentioned movement; mechanism for finally removing said print-sheet support from contact with said smut-sheet and from said print-sheet; and means for returning said print-sheet support and said smut-sheet to their original positions in the machine.

41. In mechanism of the class described, in combination with a suitable supporting frame containing vertical guides; a support for a print-sheet so mounted that it can slide in said vertical guides in the main frame of the machine; a smut-sheet; means for moving said smut-sheet into contact with a print-sheet placed upon said print-sheet support; mechanism for simultaneously slidably securing said smut-sheet in said guides in the main frame of the machine; means for then moving said smut-sheet support and said smut-sheet downward in the guides in the main frame; mechanism for finally removing said print-sheet support from contact with said smut-sheet and from said print-sheet; and means for returning said print-sheet support and said smut-sheet to their original positions in the machine.

42. In mechanism of the class described, in combination with a suitable supporting frame; a movable support for a print-sheet; a flexible smut-sheet; means for moving said flexible smut-sheet over a print-sheet upon said support; mechanism for then moving said print-sheet support and said smut-sheet to a different part of the machine without moving either with reference to the other; mechanism for finally removing said print-sheet support from contact with said smut-sheet and from said print-sheet; and means for returning said print-sheet support and said smut-sheet to their original positions in the machine.

43. In mechanism of the class described, in combination with a suitable supporting frame; a movable support for a print-sheet; a flexible smut-sheet; means for placing said flexible smut-sheet over a print-sheet upon said print-sheet support; means for moving said print-sheet support and said smut-sheet to a different part of the machine; mechanism for preventing movement of said support and said smut-sheet with reference to each other during said last mentioned movement; mechanism for finally removing said print-sheet support from contact with said smut-sheet and from said print-sheet; and mechanism for finally returning said print-sheet support and said smut-sheet to their original positions in the machine.

44. In mechanism of the class described, in combination with a suitable supporting frame; a support for a smut-sheet slidably mounted in said supporting frame; a flexible smut-sheet; means for moving said smut-sheet into contact with a print-sheet upon said print-sheet support; means for securing said smut-sheet in contact with the said print-sheet support; means for then moving said print-sheet support with the smut-sheet upon it along its slidable support in the main frame without moving said smut-sheet with reference to said print-sheet support; and mechanism for finally removing said print-sheet support from contact with said smut-sheet and from said print-sheet.

45. In mechanism of the class described, in combination with a suitable supporting frame containing vertical guides; a support for a print-sheet so mounted that it can slide in said vertical guides in the main frame of the machine; a flexible smut-sheet; means for moving said flexible smut-sheet into contact with a print-sheet placed upon said print-sheet support; means for then moving said print-sheet support and said flexible smut-sheet in said guides in the machine without moving said smut-sheet with reference to said print-sheet support during said last mentioned movement; mechanism for finally removing said print-sheet support from contact with said smut-sheet and from said print-sheet; and mechanism for finally removing said smut-sheet and said print-sheet support to their original positions in the machine.

46. In mechanism of the class described, in combination with a suitable supporting frame containing vertical guides; a support for a print-sheet so mounted that it can slide in said vertical guides in the main frame of the machine; a flexible smut-sheet; means for moving said flexible smut-sheet into contact with a print-sheet placed upon said print-sheet support; mechanism for slidably securing said smut-sheet in said guides in the main frame of the machine; means for then simultaneously moving said smut-sheet support and said smut-sheet downward in the guides in the main frame; mechanism for finally removing said print-sheet support from contact with said smut-sheet and from said print-sheet; and mechanism for finally removing said print-sheet support and said smut-sheet to their original positions in the machine.

47. In mechanism of the class described, in combination with a suitable supporting frame; a movable support for a print-sheet; a smut-sheet; mechanism for moving said smut-sheet over a print-sheet upon said support and mechanism for finally removing said print-sheet support from contact with said smut-sheet and print-sheet.

48. In mechanism of the class described, in combination with a suitable supporting-frame; a movable support for a print-sheet; a smut-sheet; means for moving said print-sheet to a position where it is above said support; mechanism for moving said smut-sheet into contact with a print-sheet on said support; and mechanism for finally removing said print-sheet support from contact with said smut-sheet and print-sheet.

49. In mechanism of the class described, in combination with a suitable supporting frame; a movable support for a print-sheet; a flexible smut-sheet; means for moving said flexible smut-sheet to a position where it is over a print-sheet on said support; and mechanism for finally removing said print-sheet support from contact with said smut-sheet and print-sheet.

50. In mechanism of the class described, in combination with a suitable supporting frame; a movable support for a print-sheet; a flexible smut-sheet; means for moving said smut-sheet to a position where it is over a print-sheet upon said support; mechanism for moving said flexible smut-sheet down into contact with the print-sheet upon said support; and mechanism for finally removing said print-sheet support from contact with said smut-sheet and print-sheet.

51. In mechanism of the class described, in combination with a suitable supporting frame; a support for a print-sheet; a flexible smut-sheet; means for stretching said flexible smut-sheet over said support above a print-sheet thereon; and mechanism for moving said smut-sheet down into contact with the print-sheet upon the support.

52. In mechanism of the class described, in combination with a suitable supporting frame; a support for a print-sheet; a smut-sheet; mechanism for moving said smut-sheet to a position where it is above a print-sheet upon said support; means for locking said smut-sheet in such position; means for withdrawing the mechanism which moved the smut-sheet; and mechanism for then moving said smut-sheet down into contact with a print-sheet upon said support.

53. In mechanism of the class described, in combination with a suitable supporting frame; a support for a print-sheet; a flexible smut-sheet; mechanism for moving said flexible smut-sheet to a position where it is above a print-sheet upon said support; means for locking said flexible smut-sheet in such position; means for withdrawing the mechanism which moves the flexible smut-sheet; and mechanism for then moving said flexible smut-sheet down into contact with a print-sheet upon said support.

54. In mechanism of the class described, in combination with a suitable supporting frame; a support for a print-sheet; a flexible smut-sheet; a feed-roller adapted to stretch said smut-sheet over a print-sheet upon said support; means for locking said smut-sheet while said feed roller is being withdrawn from it; and mechanism for then moving said smut-sheet down into contact with a print-sheet upon said support.

55. In mechanism of the class described, in combination with a suitable supporting frame; a support for a print-sheet; a smut-sheet; means for moving said smut-sheet to a position where it is above a print-sheet upon said support; means for locking the forward end of said smut-sheet while the feeding mechanism is being withdrawn; means for withdrawing the feeding mechanism past the rear end of the smut-sheet; and mechanism for then feeding said smut-sheet downward toward said print-sheet support.

56. In mechanism of the class described, in combination with a suitable supporting frame; a support for a print-sheet; a smut-sheet; feeding mechanism adapted to travel over the support to carry a smut-sheet above it to a position where it is substantially parallel to the print-sheet support; means for locking the forward end of the smut-sheet while the feeding mechanism is being withdrawn from beneath the print-sheet support; and mechanism for then moving said smut-sheet toward said print-sheet support.

57. In mechanism of the class described, in combination with a suitable supporting frame; a belt or strip of flexible smut-sheet material; mechanism for stretching a portion of the same upon said frame to form a smut-sheet support; mechanism for then placing a second adjoining portion of said smut-sheet material over a print-sheet placed upon said smut-sheet support.

58. In mechanism of the class described, in combination with a suitable supporting frame; a belt or strip of flexible smut-sheet material; mechanism for stretching a portion of the same upon said frame to form a print-sheet support; mechanism for then placing a second adjoining portion of said smut-sheet material over a print-sheet placed upon said print-sheet support; and mechanism for securing said second portion of the smut-sheet in contact with said print-sheet upon the support.

59. In mechanism of the class described, in combination with a suitable supporting-frame; a belt or strip of flexible smut-sheet material; mechanism for stretching a portion of the same upon said frame to form a print-sheet support; mechanism for then placing a second adjoining portion of said smut-sheet material over a print-sheet placed upon said print-sheet support; and mechanism for then moving both portions of said smut-sheet material to a different part of the machine without moving either with reference to the other.

60. In mechanism of the class described, in combination with a suitable supporting frame; a belt or strip of flexible smut-sheet material; mechanism for stretching a portion of the same upon said frame to form a print-sheet support; mechanism for then placing a second adjoining portion of said smut-sheet material over a print-sheet placed upon said print-sheet support; mechanism for then moving both portions of said smut-sheet material to a different part of the machine without moving either with reference to the other; and means for finally removing the print-sheet support from beneath the print-sheet and upper smut-sheet.

61. In mechanism of the class described, in combination with a suitable supporting frame; a belt or strip of flexible smut-sheet material; mechanism for stretching a portion of the same upon said frame to form a print-sheet support; mechanism for then placing a second adjoining portion of said smut-sheet material over a print-sheet placed upon said print-sheet support; and means for finally removing said lower smut-sheet from beneath said print-sheet and upper smut-sheet.

62. In mechanism of the class described, in combination with a suitable supporting-frame; an endless belt of smut-sheet material; mechanism for folding successive portions of said belt into zigzags and means for holding the successive folded portions of the belt in contact with each other for the purposes set forth.

63. In mechanism of the class described, in combination with a suitable supporting frame; an endless belt of smut-sheet material; mechanism for folding successive portions of said belt into zigzags, as described; and mechanism for detachably securing the ends of said zigzags to said frame.

64. In mechanism of the class described, in combination with a suitable supporting frame; an endless belt of smut-sheet material; mechanism for successively folding portions of said belt into a series of zigzags, one above the other, as described, and means for unfolding the first formed zigzags as the last zigzag is formed, whereby the unzigzagged portion of the belt is maintained at substantially a constant length during the operation of the machine.

65. In mechanism of the class described, in combination with a suitable supporting frame; an endless belt of smut-sheet material; means for successively folding portions of said belt into successive zigzags, one adjacent to the other as described; means for detachably securing each zigzag as formed to the pile of zigzags; and means for feeding said pile of zigzag portions of the belt through the frame of the machine without moving said folded portions of smut-sheet material with reference to each other.

66. In mechanism of the class described, in combination with a suitable supporting frame; an endless belt of smut-sheet material; means for successively folding portions of said belt into successive horizontal zigzags, one above the other as described; means for detachably securing each zigzag as formed to the top of the pile of zigzags; means for feeding said pile of zigzag portions of the belt downward through the frame of the machine without moving said folded portions of smut-sheet material with reference to each other; and automatic means for releasing the first-formed zigzag at the bottom of the machine as the last zigzag is formed at the top, whereby the non-folded portion of the belt is maintained at approximately constant length during the operation of the machine.

67. In mechanism of the class described, in combination with a suitable supporting frame having a plurality of upright guides; an endless belt of smut-sheet material having at proper intervals projecting members adapted to engage said guides; means for successively stretching portions of said belt into zigzags so that said projecting members attached to it come over said guides; means for temporarily holding each zigzag portion of the belt over the guides while the stretching mechanism is withdrawn; and mechanism for then feeding such zigzag portion of the belt downward into engagement with the guides.

68. In mechanism of the class described, in combination with a suitable supporting frame having a plurality of upright guides; an endless belt of smut-sheet material having at proper intervals projecting members adapted to engage said guides; means for successively stretching portions of said belt into zigzags so that said projecting members attached to it at the edges of the zigzag folds are over said guides; means for temporarily holding said projecting members over the guides while the feeding mechanism is withdrawn; mechanism for then feeding said projecting members down into the guides; and automatic mechanism for releasing the members attached to the first-formed zigzag from the guides as the last zig-zag is formed, so that the non-folded portion of the belt remains of substantially constant length, as described.

69. In mechanism of the class described, in combination with a suitable supporting frame, at least four upright guides at the corners of a space greater than the area of the print-sheet which is to be smutted; an endless belt of smut-sheet material of less width than the space between the said guides which are on opposite sides of the machine; bars or rods attached to said belt at intervals along its length equal to the distance between the guides which are at the front and rear of the frame, the ends of said bars being adapted to slidably fit in the guides which they are successively placed over; mechanism for successively folding portions of said belt into zigzags, the successive bars attached to the belt being always at the edges of said zigzags, as described; means for temporarily locking said bars over their respective guides while the feeding mechanism is withdrawn from the freshly formed zigzag; and mechanism for feeding said bars attached to the freshly formed zigzag down into the guides which the respective bars are over.

70. In mechanism of the class described, in combination with a suitable supporting frame; at least four upright guides, at the corners of a space greater than the area of the print-sheet which is to be smutted; an endless belt of smut-sheet material of less width than the space between the said guides which are on opposite sides of the machine; bars or rods attached to said belt at intervals along its length equal to the distance between the guides which are at the front and rear of the frame, the ends of said bars being adapted to slidably fit in the guides which they are successively placed over; mechanism for successively folding portions of said belt into zigzags, the successive bars attached to the belt being always at the edges of said zigzags, as described; means for temporarily locking said bars over their respective guides while the feeding mechanism is withdrawn from the freshly formed zigzags; mechanism for feeding said bars attached to the freshly formed zigzag down into the guides which the respective bars are over; and mechanism for releasing the bars on the first-formed zigzag from the bottom of the guides as the last zigzag is formed, whereby the non-folded portion of the belt is maintained at substantially a constant tension.

71. In mechanism of the class described, in combination with a suitable supporting frame; at least four guides, at the corners of a space greater than the area of the print-sheet which is to be smutted; an endless belt of smut-sheet material of less width than the distance between the guides on opposite sides of the machine; a plurality of bars attached to said belt at intervals along its length equal to the distance between the guides which are at the front and rear of the machine, the ends of alternate bars being adapted to fit into the guides at the front of the machine, and the ends of the intermediate bars being adapted to fit into the guides which are at the rear of the machine; mechanism for engaging a portion of said belt at the rear of the machine and moving it to such a position that the first bar upon it, which is designed to fit into the front guides, is over them; mechanism for detachably locking said bar in said position; mechanism for gradually removing the feeding mechanism to a point behind the guides at the rear of the machine and behind the first bar upon the belt which is to go into said rear guides; mechanism for feeding said front bar downward into said front guides; and automatic mechanism adapted, after the feeding mechanism has passed behind the rear bar, to feed said bar downward into the rear guides and hold it in said guides while the feeding mechanism is traveling forward with a portion of the belt bearing a second bar for the front guides, to repeat the operation just described.

72. In mechanism of the class described, in combination with a suitable supporting frame, at least four guides, at the corners of a space greater than the area of the print-sheet which is to be smutted, an endless belt of smut-sheet material of less width than the distance between the guides on opposite sides of the machine; a plurality of bars attached to said belt at intervals along its length equal to the distance between the guides which are at the front and rear of the machine; the ends of alternate bars being adapted to fit into the guides at the front of the machine and the ends of the intermediate bars being adapted to fit into the guides which are at the rear of the machine; a feed roller mounted upon a track extending from front to rear of the machine; mechanism adapted to move said roller from rear to front of the machine in engagement with said belt to stretch a portion of said belt over the space on which a print-sheet is to be smutted and to carry the first bar which is to engage the front guides to a position where it is over said front guides; means for temporarily securing said front bar in that position; means for gradually removing said roller along its track to a position at the rear of the machine behind the rear guides and the first bar which is to fit into them; and automatic means for then engaging said rear bar, fitting it into said rear guides and holding it in such position while said roller is moved forward again with the next portion of said belt to place a second front bar over said front guides, as described.

73. In mechanism of the class described, in combination with a suitable supporting frame, at least four guides at the corners of a space greater than the area of the print-sheet which is to be smutted; an endless belt of smut-sheet material of less width than the distance between the guides on opposite sides of the machine; a plurality of bars attached to said belt at intervals along its length equal to the distance between the guides which are at the front and rear of the machine, the ends of alternate bars being adapted to fit into the guides at the front of the machine and the ends of the intermediate bars being adapted to fit into the guides which are at the rear of the machine; mechanism for engaging a portion of said belt at the rear of the machine and moving it to such a position that the first bar upon it, which is designed to fit into the front guides, is over them; mechanism for detachably locking said bar in said position; mechanism for gradually removing the feeding mechanism to a point behind the guides at the rear of the machine and behind the first bar upon the belt which is to go into said rear guides; mechanism for feeding said front bar downward into said front guides; automatic mechanism adapted, after the feeding mechanism has passed behind the rear bar, to feed said bar downward into the rear guides and hold it in said guides while the feeding mechanism is traveling forward with a second bar for the front guides to repeat the operation just described; and automatic mechanism for successively releasing from the bottoms of said guides, bars which have been previously secured in the guides, as described, at such times that the portion of the belt which is not folded into the guides as described, is maintained at substantially a constant length.

74. In mechanism of the class described, in combination with a suitable supporting frame; at least four guides at the corners of a space greater than the area of the print-sheet which is to be smutted; an endless belt of smut-sheet material of less width than the distance between the guides on opposite sides of the machine; a plurality of bars attached to said belt at intervals along its length equal to the distance between the guides which are at the front and rear of the machine, the ends of alternate bars being adapted to fit into the guides at the front of the machine, and the ends of the intermediate bars being adapted to fit into the guides which are at the rear of the machine; a feed roller mounted upon a track extending from front to rear of the machine; mechanism adapted to move said roller from rear to front of the machine in engagement with said belt to stretch a portion of said belt over a space on which a print-sheet is to be smutted and to carry the first bar which is to engage the front guides to a position where it is over said front guides; means for temporarily securing said front bar in that position; means for gradually removing said roller along its track to a position at the rear of the machine behind the rear guides and the first bar which is to fit into them; automatic means for then engaging said rear bar, fitting it into said rear guides and holding it in such position while said roller is moved forward into contact with the next portion of said belt to place a second front bar over said front guides, as described; automatic mechanism for successively releasing from the bottoms of said guides, bars which have been previously secured in the guides as described, at such times that the portion of the belt which is not folded into the guides, as described, can be maintained at substantially a constant length; and means for keeping the non-folded portion of the belt tight.

75. In mechanism of the class described, in combination with a suitable supporting frame; at least four guides at the corners of a space greater than the area of the print-sheet which is to be smutted; an endless belt of smut-sheet material of less width than the distance between the guides on opposite sides of the machine; a plurality of bars attached to said belt at intervals along its length equal to the distance between the guides which are at the front and rear of the machine; the ends of alternate bars being adapted to fit into the guides at the front of the machine, and the ends of the intermediate bars being adapted to fit into the guides which are at the rear of the machine; a feed roller mounted upon a track extending from front to rear of the machine; mechanism adapted to move said roller from rear to front of the machine in engagement with said belt to stretch a portion of said belt over the space on which a print-sheet is to be smutted and to carry the first bar which is to engage the front guides to a position where it is over said front guides; means for temporarily securing said front bar in that position; means for gradually removing said roller along its track to a position at the rear of the machine behind the rear guides and the first bar which is to fit into them, automatic means for then engaging said rear bar, fitting it into said rear guides and holding it in such position when said roller is moved forward into contact with the next portion of said belt to place a second front bar over said front guides, as described; automatic mechanism for successively releasing from the bottoms of said guides, bars which have been previously secured in the guides, as described, at such times that the portion of the belt which is not folded into the guides, as described, can be maintained at substantially a constant length; a delivery roller engaging said belt at the bottom of the machine as it is released, said roller traveling on a track approximately parallel to the track on which the feed roller travels; and mechanism for always moving said delivery roller in the opposite direction from that in which the feed roller is moving and at the same speed whereby the portion of said belt which is not in the guides of the machine is maintained at substantially a constant length.

76. In mechanism of the class described, in combination with a suitable supporting frame and an endless belt of smut-sheet material adapted to be folded into successive zigzags and fed through the machine; a feed roller engaging said belt to form said zigzags, and a delivery roller engaging said belt as it is released from said zigzags; and automatic mechanism for moving said rollers in opposite directions on approximately parallel tracks, whereby the length of the belt, which is not in zigzags, between the feed roller and delivery roller, is substantially a constant quantity in all positions of said rollers.

77. In mechanism of the class described, in combination with a suitable supporting frame and a belt of smut-sheet material adapted to be folded into successive zigzags; a pair of guides at the lines of fold in said belt; recesses in said guides; a bar upon said belt adapted to slide in said guides; automatic mechanism for temporarily engaging the ends of said bar upon said belt to hold it over said guides against the pull of said belt at right angles to said guides; and automatic feeding mechanism adapted to then engage the ends of said bar and feed them into said guides.

78. In mechanism of the class described, in combination with a suitable supporting frame and a belt of smut-sheet material adapted to be folded; a pair of guides adjacent to said lines of fold; a bar upon said belt adapted to have its ends fit into said guides; mechanism adapted to move said belt to a position where the bar is above said guides and above said feeding mechanism; and automatic mechanism adapted to grasp said bar as said feeding mechanism is withdrawn from beneath it, feed it down into said guides and hold it there until said feeding mechanism has passed over it with another portion of the belt.

79. In mechanism of the class described, in combination with a suitable supporting frame and an endless belt of smut-sheet material having at intervals along its length, bars as described; two guides attached to said supporting frame having slots in their faces containing the ends of a plurality of said bars upon the smut-sheet belt; a movable supporting roller engaging the lower one of said bars; a plurality of notches in said bars adapted to allow a bar, when its notch is in register with its roller, to pass the roller, the notches upon successive bars being out of line with each other; and mechanism for moving said roller backward and forward between the positions of successive notches in said bars, whereby, as said roller is moved, the bottom bar is released from the guides, substantially as described.

80. The combination of a constantly running automatic machine adapted to automatically dry or smut print sheets as they come from a printing press; an inclosing chamber; and mechanism for heating the interior of said chamber to a high temperature, substantially as described.

81. In a smut-sheeting machine, in combination with a frame having therein a pair of guides, a portion of smut-sheet material carrying bars at intervals of its length, having their ends adapted to slide in said guides and means for moving said smut-sheet material so that one of said bars is adjacent to but clear of said guides; a driving shaft, two cams upon said shaft, a lever slidably mounted on a pivotal support on the frame having one end adapted to, in one position, engage the bar on the smut-sheet material; and a connecting mechanism between said lever and each of said cams, whereby, as the shaft is operated, the end of the lever carries one end of the bar on the smut-sheet into one of the guides of the machine, as described.

82. In mechanism of the class described in combination with a support for a print sheet, a smut sheet, means for placing said smut sheet in close proximity to, but clear of, a temporarily stationary print sheet upon said support and means for then releasing the smut sheet and allowing it to move substantially perpendicularly to said print sheet into contact therewith.

83. In mechanism of the class described in combination with a print sheet, a smut sheet attached at one end of said support, and normally not obstructing the same, means for moving said smut sheet to a position where it covers, but is clear of, the print sheet upon said support, and means for then releasing said smut sheet so that it may move substantially perpendicular to the print sheet into contact therewith.

84. In mechanism of the class described in combination with a support for a print sheet, a flexible smut sheet attached to one end of said support normally clear of said support, mechanism for gradually bending said smut sheet to a position where it covers a print sheet upon said support, said mechanism maintaining the smut sheet clear of the print sheet during the whole of said bending operation, and mechanism for then moving said smut sheet substantially perpendicularly to the print sheet into contact therewith and for then temporarily securing the smut sheet in contact with said print sheet.

In witness whereof, I have hereunto subscribed my name in the presence of two witnesses.

JAMES E. GILBERT.

Witnesses:
HOWARD M. COX,
DWIGHT B. CHEEVER.